United States Patent
Yamada et al.

(10) Patent No.: US 8,665,484 B2
(45) Date of Patent: Mar. 4, 2014

(54) PROCESSING TILE IMAGES INCLUDING OVERLAP REGIONS

(75) Inventors: Naoto Yamada, Kawasaki (JP); Jun Nishiyama, Stony Brook, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 12/877,011

(22) Filed: Sep. 7, 2010

(65) Prior Publication Data

US 2011/0080597 A1  Apr. 7, 2011

(30) Foreign Application Priority Data

Oct. 6, 2009  (JP) .................................. 2009-232862

(51) Int. Cl.
*G06K 15/02* (2006.01)
*H04N 1/60* (2006.01)

(52) U.S. Cl.
USPC ............................................ 358/1.2; 358/1.9

(58) Field of Classification Search
None
See application file for complete search history.

(56) References Cited

U.S. PATENT DOCUMENTS

| 4,717,962 A | 1/1988 | Moore |
| 6,671,418 B2 | 12/2003 | Rengakuji et al. |
| 2004/0081346 A1* | 4/2004 | Louden et al. ................ 382/141 |
| 2004/0189819 A1* | 9/2004 | Saito ........................... 348/222.1 |
| 2004/0246507 A1* | 12/2004 | Hattori ........................... 358/1.2 |
| 2006/0124012 A1* | 6/2006 | Frei ................................ 101/484 |
| 2008/0094665 A1* | 4/2008 | Nakai et al. ................... 358/401 |
| 2010/0053707 A1* | 3/2010 | Mori ............................. 358/505 |
| 2012/0051649 A1* | 3/2012 | Saund et al. .................. 382/195 |

FOREIGN PATENT DOCUMENTS

| EP | 0942588 A2 | 9/1999 |
| GB | 2247132 A | 2/1992 |
| JP | 2005198121 A | 7/2005 |

OTHER PUBLICATIONS

Lee et al., "Parallel image processing applications on a network of workstations", Parallel Computing 21, pp. 137-160 (1995).
European Search Report issued on Dec. 27, 2011 concerning European Patent Application No. 10175372.1.

* cited by examiner

*Primary Examiner* — Vincent Rudolph
(74) *Attorney, Agent, or Firm* — Fitzpatrick, Cella, Harper & Scinto

(57) ABSTRACT

There is disclosed an image processing apparatus and a control method thereof in which input image data and generates a plurality of tile images, each including a substance region and overlap regions each of which overlaps with a part of each adjacent tile image, by dividing the input image data. The apparatus executes image processing separately on each of the plurality of the generated tile images, and when generating each tile image, converts a resolution of image data in the overlap regions such that the resolution of the image data in the overlap regions is smaller than a resolution of image data in the substance region.

6 Claims, 27 Drawing Sheets

F I G.  7

FILTER CALCULATION EQUATION
FILOUT_22= CA00 × D22
+CA01 × (D15+D29)
+CA02 × (D14+D16+D28+D30)
+CA03 × (D21+D23)
+CA04 × (D8+D36)
+CA05 × (D7+D9+D35+D37)
+CA06 × (D6+D10+D34+D38)
+CA07 × (D13+D17+D27+D31)
+CA08 × (D20+D24)

F I G. 9

| CA 06 | CA 05 | CA 04 | CA 05 | CA 06 |
|---|---|---|---|---|
| CA 07 | CA 02 | CA 01 | CA 02 | CA 07 |
| CA 08 | CA 03 | CA 00 | CA 03 | CA 08 |
| CA 07 | CA 02 | CA 01 | CA 02 | CA 07 |
| CA 06 | CA 05 | CA 04 | CA 05 | CA 06 |

F I G. 10

FILTER CALCULATION EQUATION
FILOUT_06= CA00 × D6
+CA01 × (D1+D13)
+CA02 × (D0+D1+D5+D14)
+CA03 × (D5+D7)
+CA04 × (D1+D20)
+CA05 × (D0+D1+D19+D21)
+CA06 × (D0+D2+D19+D22)
+CA07 × (D0+D2+D5+D15)
+CA08 × (D5+D8)

FILTER CALCULATION EQUATION
FILOUT_24= CA00 × D24
  +CA01 × (D15+D31)
  +CA02 × (D14+D16+D30+D32)
  +CA03 × (D23+D25)

| CA 02 | CA 01 | CA 02 |
| --- | --- | --- |
| CA 03 | CA 00 | CA 03 |
| CA 02 | CA 01 | CA 02 |

FILTER CALCULATION EQUATION
FILOUT_06= CA00 × D6
+CA01 × (D0+D6)
+CA02 × (D0+D1+D12+D6)
+CA03 × (D12+D6)

F I G. 20

FILTER CALCULATION EQUATION
FILOUT_19 = CA00 × D19
　　　　　　+ CA01 × (D11+D26)
　　　　　　+ CA02 × (D10+D12+D25+D27)
　　　　　　+ CA03 × (D18+D20)

F I G. 21

FILTER CALCULATION EQUATION
FILOUT_03 = CA00 × D3
　　　　　　+ CA01 × (D0+D3)
　　　　　　+ CA02 × (D0+D0+D17+D3)
　　　　　　+ CA03 × (D17+D3)

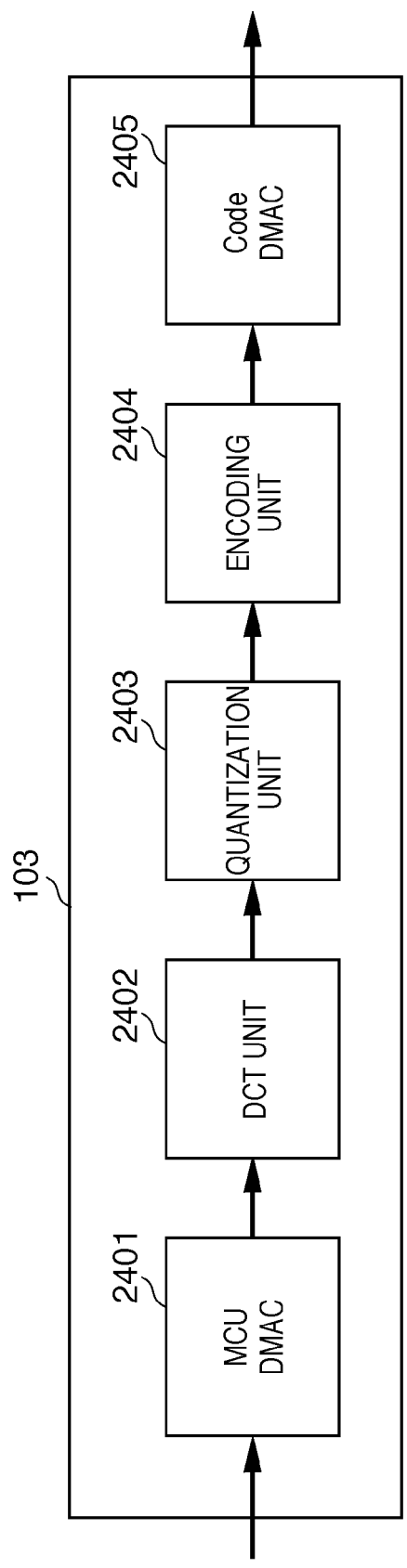
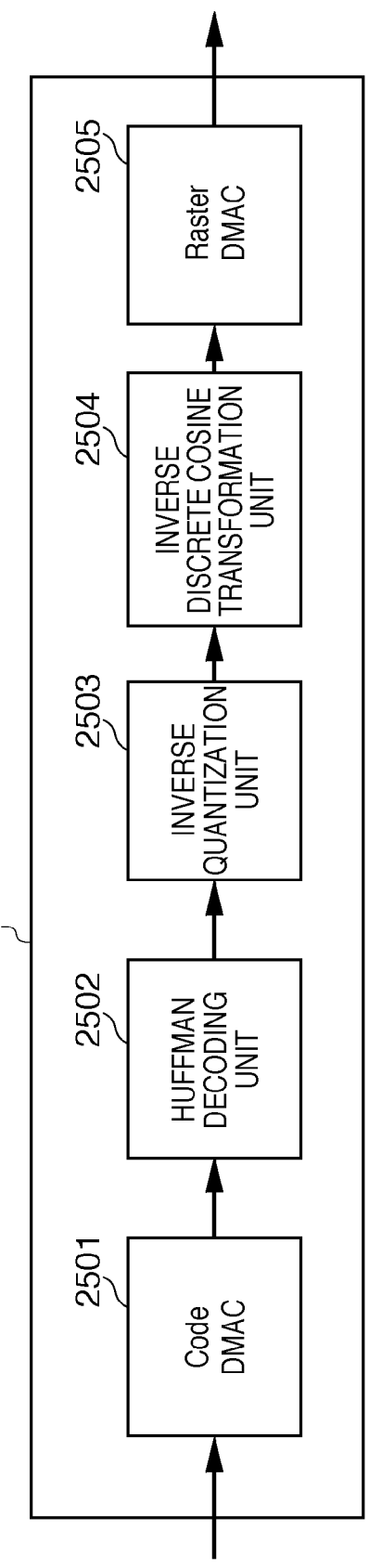
FIG. 22A
FIG. 22B

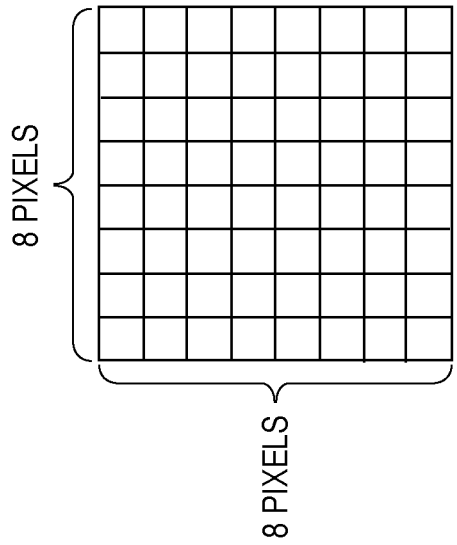
FIG. 24A  R
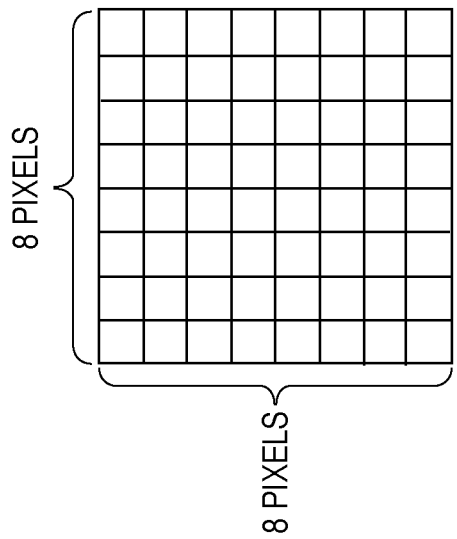
FIG. 24B  G
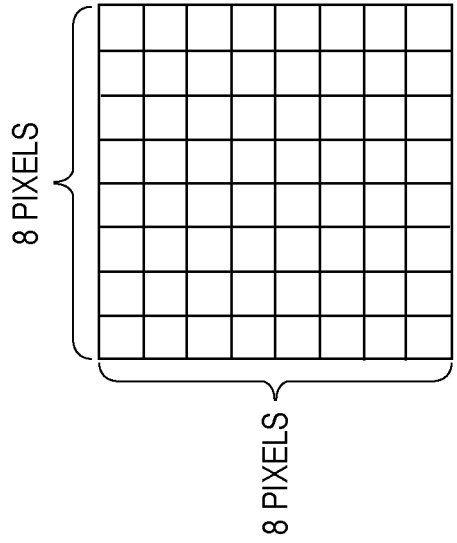
FIG. 24C  B

FIG. 25A

AfterDCT (0,0)

| 56 | 87 | 86 | 97 | 79 | 86 | 75 | 75 |
|---|---|---|---|---|---|---|---|
| 86 | 85 | 87 | 100 | 54 | 100 | 57 | 46 |
| 86 | 86 | 65 | 46 | 95 | 97 | 97 | 78 |
| 64 | 73 | 53 | 57 | 75 | 87 | 67 | 40 |
| 64 | 53 | 35 | 78 | 78 | 46 | 16 | 43 |
| 31 | 32 | 42 | 23 | 13 | 32 | 8 | 8 |
| 89 | 15 | 24 | 56 | 42 | 8 | 8 | 4 |
| 46 | 77 | 64 | 12 | 14 | 13 | 15 | 4 |

AfterDCT (7,7)

| 14 | 8 | 4 | 3 | 0 | 0 | 0 | 0 |
|---|---|---|---|---|---|---|---|
| 8 | 4 | 3 | 2 | 0 | 0 | 0 | 0 |
| 4 | 2 | 1 | 0 | 0 | 0 | 0 | 0 |
| 2 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(7,7)

QT_A(i,j)=AfterDCT(i,j)/QTableA

| 14 | 4 | 4 | 4 | 3 | 4 | 3 | 3 |
|---|---|---|---|---|---|---|---|
| 4 | 4 | 4 | 5 | 2 | 5 | 2 | 2 |
| 4 | 4 | 3 | 2 | 4 | 4 | 4 | 3 |
| 3 | 3 | 2 | 2 | 3 | 4 | 3 | 2 |
| 3 | 2 | 1 | 3 | 3 | 2 | 0 | 2 |
| 1 | 1 | 2 | 1 | 0 | 1 | 0 | 0 |
| 4 | 0 | 1 | 2 | 2 | 0 | 0 | 0 |
| 2 | 3 | 3 | 0 | 0 | 0 | 0 | 0 |

(7,7)

QT_B(i,j)=AfterDCT(i,j)/QTableB

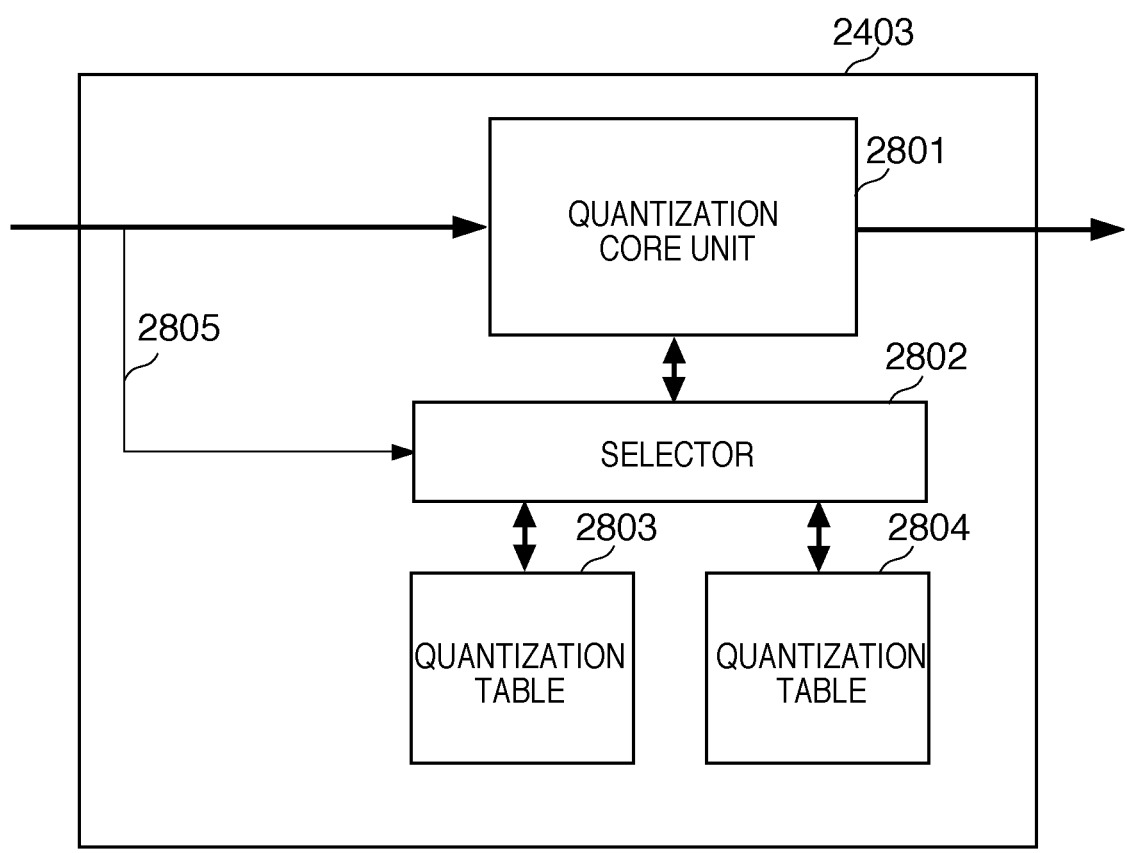
F I G. 26

FIG. 27A

| 4 | 10 | 20 | 30 | 40 | 100 | 100 | 100 |
|---|----|----|----|----|-----|-----|-----|
| 10 | 20 | 30 | 40 | 100 | 100 | 100 | 100 |
| 20 | 30 | 40 | 100 | 100 | 100 | 100 | 100 |
| 30 | 40 | 100 | 100 | 100 | 100 | 100 | 100 |
| 40 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |

Table A
(For overlap MCU)

FIG. 27B

| 4 | 10 | 15 | 20 | 20 | 20 | 20 | 20 |
|---|----|----|----|----|----|----|----|
| 10 | 15 | 20 | 20 | 20 | 20 | 20 | 20 |
| 15 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |
| 20 | 20 | 20 | 20 | 20 | 20 | 20 | 20 |

Table B
(For substance MCU)

FIG. 30A (0,0)   Inv_QT_A

| 56 | 80 | 80 | 90 | 0 | 0 | 0 | 0 |
|----|----|----|----|---|---|---|---|
| 80 | 80 | 90 | 80 | 0 | 0 | 0 | 0 |
| 80 | 60 | 40 | 0  | 0 | 0 | 0 | 0 |
| 60 | 40 | 0  | 0  | 0 | 0 | 0 | 0 |
| 40 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

(7,7)

Inv_QT_A(i,j)=QT_A(i,j)*QTableA

FIG. 30B (0,0)   Inv_QT_B

| 56 | 40 | 60 | 80  | 60 | 80  | 60 | 60 |
|----|----|----|-----|----|-----|----|----|
| 40 | 60 | 80 | 100 | 40 | 100 | 40 | 40 |
| 60 | 80 | 80 | 40  | 80 | 80  | 80 | 60 |
| 60 | 60 | 40 | 40  | 60 | 80  | 60 | 40 |
| 60 | 40 | 20 | 60  | 60 | 40  | 0  | 40 |
| 20 | 20 | 40 | 20  | 0  | 20  | 0  | 0  |
| 80 | 0  | 20 | 40  | 40 | 0   | 0  | 0  |
| 40 | 60 | 60 | 0   | 0  | 0   | 0  | 0  |

(7,7)

Inv_QT_B(i,j)=QT_B(i,j)*QTableB

PROCESSING TILE IMAGES INCLUDING OVERLAP REGIONS

BACKGROUND OF THE INVENTION

1. Field of the Invention

The present invention relates to an image processing apparatus that performs predetermined image processing on image data and outputs the data, and a method of controlling the apparatus.

2. Description of the Related Art

In image processing apparatuses, such as copy machines, facsimile machines and laser printers, input digital image data is stored line-by-line in a line memory, and rotation, various types of filtering and the like are performed. In this manner, image processing is executed on the image data as rotation, smoothing, enlargement/reduction, and edge enhancement. Image processing apparatuses that execute such image processing generally include a page memory and an image processor including a rotation unit, a filtering unit and the like for image processing usage and image data editing usage. Such an image processor will be described taking a rotation unit that rotates image data, for example, 90 degrees as an example. When rotating image data 90 degrees, image data corresponding to one page is written into, for example, a page memory in raster order (horizontal scan order). Then, when reading the image data, by reading the image data in the vertical direction, the image data can be rotated. However, implementation of such rotation requires a huge page memory that can handle a maximum size of one page.

As a method for suppressing the increase of the capacity of page memory, a method has been proposed in which a page image is divided into tile images, the image data is rotated in units of tiles, the rotated tile images are finally combined, and thereby the page image is rotated.

According to this method, however, when filter calculation is performed on a pixel of interest by referring to the pixel of interest and peripheral pixels surrounding the pixel of interest, if the pixel of interest is a pixel located on the boundary between tile images, it is not possible to execute calculation with a single tile image. Accordingly, when the pixel of interest is a pixel located on the boundary between tile images, in order to perform calculation including the peripheral pixels, it is necessary to provide a band memory capable of storing a plurality of tile images according to the size of filter calculation.

As a solution for such calculation that refers to peripheral pixels, for example, Japanese Patent Laid-Open No. 2005-198121 proposes a method in which pixels are overlapped when dividing an original image to be processed into tile images, so that a pixel of interest located in the vicinity of the boundary between tile images can refer to the peripheral pixels. When processing the pixel located on the boundary between tile images by using the peripheral pixels, filter calculation or the like is performed by referring to the pixels in the overlap portion without requiring a line memory for storing peripheral pixels as described above.

However, when dividing an image into tile images, if overlap portions are added and then the image is divided as described above, the amount of data of each tile image will be the sum of the amount of actual image data (a portion that does not overlap) and the amount of image data of the overlap portion. For example, in the case of a tile image including 16×16 pixels (256 pixels), if two pixels are added to the left, right, upper and lower sides of each tile image as peripheral pixels constituting an overlap portion, the total amount of data will be 20×20 pixels (400 pixels). In other words, the amount of data of a tile image to which an overlap portion has been added is 1.5 times larger than that of a tile image to which an overlap portion has not been added, and the throughput required for a memory when reading the tile image from the memory will also be 1.5 times higher. Accordingly, when the throughput is less than required, increased frequency, increased bus width and the like are required as memory specifications, and it is not possible to avoid an increase in memory cost.

SUMMARY OF THE INVENTION

An aspect of the present invention is to eliminate the above-mentioned problems with the conventional technology.

A feature of the present invention is to provide an image processing apparatus with which image processing can be implemented by referring to peripheral pixels surrounding a pixel of interest while reducing the amount of data of an overlap portion, and a method of controlling the apparatus.

According to an aspect of the present invention, there is provided an image processing apparatus comprising: an input unit that inputs image data; a generation unit that generates a plurality of tile images, each including a substance region and overlap regions each of which overlaps with a part of each adjacent tile image, by dividing the image data input by the input unit; and an image processing unit that executes image processing separately on each of the plurality of tile images generated by the generation unit, wherein the generation unit, when generating each tile image, converts a resolution of image data in the overlap regions such that the resolution of the image data in the overlap regions is smaller than a resolution of image data in the substance region.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view showing an explanatory diagram of a calculation process for a pixel of interest D22 performed by a 5×5 filter calculation unit.

FIG. 9 is a diagram describing an example of filter coefficients used in filter calculation.

FIG. 10 is a diagram describing filter calculation for a pixel of interest D6.

FIG. 20 is a diagram describing filter calculation for a pixel of interest D19 performed by a filter calculation unit.

FIG. 21 is a diagram describing filter calculation for a pixel of interest D3 performed by the filter calculation unit.

FIG. 22A is a block diagram describing a configuration of an image compression unit according to a third embodiment.

FIG. 22B is a block diagram describing a configuration of an image decompression unit according to the third embodiment.

FIGS. 24A to 24C are diagrams describing minimum coded units (MCUs) according to the third embodiment.

FIGS. 25A to 25C are diagrams describing an example of quantization according to the third embodiment.

FIG. 26 is a block diagram describing a configuration of a quantization unit according to the third embodiment.

FIGS. 27A and 27B are diagrams describing examples of quantization tables.

FIGS. 30A and 30B are diagrams describing examples of inverse quantized values.

DESCRIPTION OF THE EMBODIMENTS

Embodiments of the present invention will now be described hereinafter in detail with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
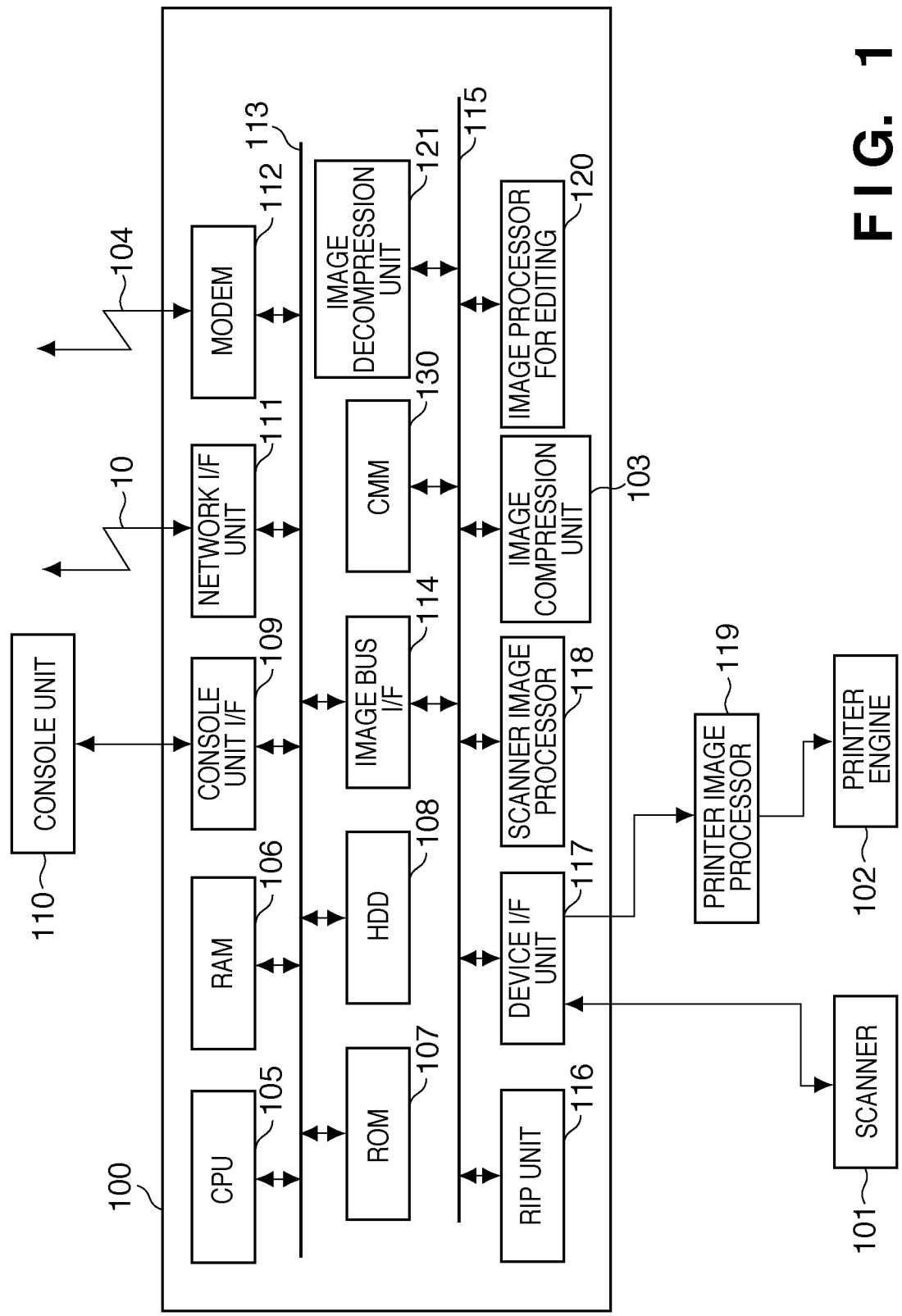
FIG. 1 is a block diagram describing an overall configuration of an image processing apparatus according to an embodiment of the present invention.

FIG. 1 is a block diagram describing an overall configuration of an image processing apparatus (multi function peripheral) 100 according to the present embodiment.

In FIG. 1, the image processing apparatus 100 includes a scanner 101, which is an image input device, and a printer engine 102 that performs printing based on image data processed by a printer image processor 119. The image processing apparatus 100 connects to a LAN 10 and a public line 104, and inputs/outputs image information and device information. A CPU 105 is a central processing unit for controlling the entire image processing apparatus 100. A RAM 106 provides a work memory for the CPU 105 to perform operations, as well as an image memory for temporarily storing input image data. A ROM 107 is a boot ROM in which a system boot program is stored. A HDD 108 is a hard disk drive, which stores system software for various types of processing, input image data and the like. A console unit I/F 109 is an interface unit of a console unit 110 that has a display screen capable of displaying image data and the like, operation buttons, and so on. A network interface 111 is implemented by, for example, a LAN card or the like, and inputs/outputs information to/from external apparatuses via the LAN 10. A modem 112 inputs/outputs information to/from external apparatuses via the public line 104. The units described above are disposed on a system bus 113.

An image bus I/F 114 is an interface for connecting the system bus 113 and an image bus 115 that transfers image data at high speed, and is a bus bridge that converts data structures. The image bus 115 is connected to a raster image processor (RIP) unit 116, a device I/F unit 117, a scanner image processor 118, an image processor 120 for editing, an image compression unit 103, an image decompression unit 121, and a color management module (CMM) 130. The RIP unit 116 expands page description language (PDL) code and vector data, which will be described later, to images. The device I/F unit 117 connects the scanner 101 and the printer engine 102 to the image processing apparatus 100, and performs conversion between synchronous and asynchronous systems of image data. The scanner image processor 118 performs various types of processing, such as correction, image processing and editing, on image data input from the scanner 101. The image processor 120 for editing performs various types of image processing such as rotation and trimming/masking on image data. The image compression unit 103 encodes image data that has been processed by the scanner image processor 118 and the image processor 120 for editing in a predetermined compression format when storing data in the HDD 108. The image decompression unit 121 decodes and decompresses the compressed image data stored in the HDD 108. The printer image processor 119 performs processing according to the printer engine 102 such as image processing and resolution conversion on image data to be output to the printer engine 102. The CMM 130 is a dedicated hardware module that performs a color conversion process (color space conversion process) on image data based on profiles and calibration data. As used herein, profiles are information such as functions for converting color image data expressed in a device-dependent color space to a device-independent color space (for example, La*b* or the like). Calibration data is data for modifying color reproduction characteristics of the scanner 101 and the printer engine 102.

Figure 2:
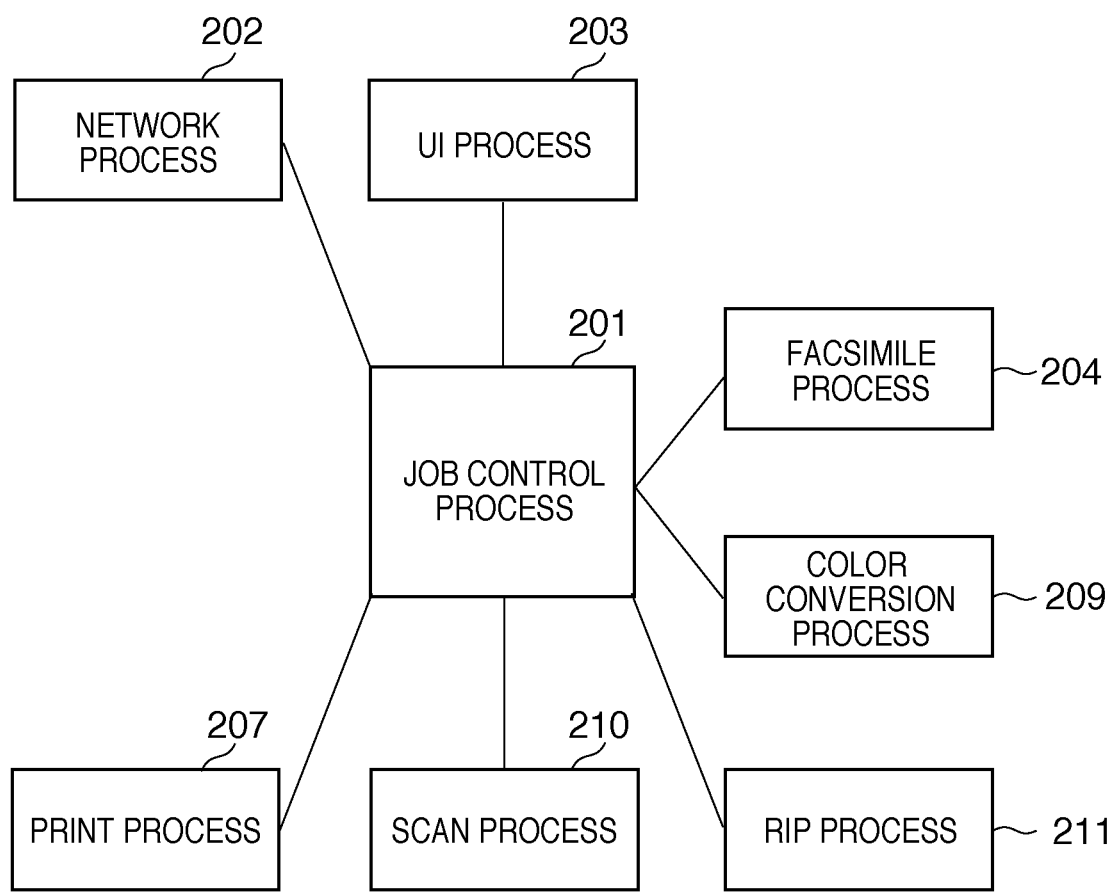
FIG. 2 depicts a view illustrating a configuration diagram of software modules for controlling the image processing apparatus.

FIG. 2 is a diagram describing a configuration of software modules for controlling the image processing apparatus 100 according to the present embodiment. These software modules primarily operate under the control of the CPU 105.

A job control process 201 manages and controls respective software modules, as well as controlling all jobs generated in the image processing apparatus 100 such as copy, print, scan and fax transmission/reception. A network process 202 is a module that controls communication with external apparatuses that is primarily performed via a network I/F 111, and controls communication with each device disposed on the LAN 10. The network process 202, upon receiving control commands and data from the respective devices of the LAN 10, notifies the job control process 201 of the content thereof. The network process 202 also transmits the control commands and data to the respective devices on the LAN 10 based on instructions from the job control process 201.

A UI process 203 performs control primarily relating to the console unit 110 and the console unit I/F 109. The UI process 203 notifies the job control process 201 of the content of operations of the console unit 110 performed by an operator, and controls the content of display on a display screen of the console unit 110 based on an instruction from the job control process 201. A facsimile process 204 receives images by fax via the modem 112, performs specific image processing on the fax images, and then notifies the job control process 201 of the received images. The facsimile process 204 also transmits, by fax, designated images from the job control process 201 to designated notification destinations. A print process 207 controls the image processor 120 for editing, the printer image processor 119 and the printer engine 102 based on instructions from the job control process 201, and prints designated images. The print process 207 receives image data, image information (the size, color mode, resolution and the like of the image data), layout information (offset, enlargement/reduction, imposition and the like) and paper information (size, print orientation and the like) from the job control process 201. Then, the print process 207 controls the image compression unit 103, the image decompression unit 121, the image processor 120 for editing and the printer image processor 119 to perform appropriate image processing on the image data, and controls the printer engine 102 to print the data onto paper.

A scan process 210 controls the scanner 101 and the scanner image processor 118 to cause the scanner 101 to read an original based on an instruction from the job control process 201. The instruction from the job control process 201 includes a color mode, and processing according to the color mode is performed in the scan process 210. Specifically, when the color mode has been set to color, the original is input as color images, and when the color mode has been set to monochrome, the original is input as monochrome images. When the color mode has been set to "auto", whether the original is in color or monochrome is determined by pre-scanning or the like, and the original is scanned again and input as images based on the result of the determination. The scan process 210 scans an original by using the scanner 101, and inputs image data in the form of digital data. Color information of the images thus input is notified to the job control process 201. The scan process 210 also controls the scanner image processor 118 to perform image processing, such as compression, on the input images, and then notifies the job control process 201 of the image-processed input images.

A color conversion process 209 performs, based on an instruction from the job control process 201, a color conversion process on the images specified in the instruction, and notifies the job control process 201 of the color-converted images. The job control process 201 notifies the color conversion process 209 of input color space information, output color space information and images to which color conversion is applied. When the output color space notified to the color conversion process 209 is an input device-independent color space (for example, La*b* space), input profile information that is information for converting an input device-dependent input color space (for example, RGB) to a La*b* is also notified. In this case, the color conversion process 209 creates a lookup table (LUT) for mapping an input color space to a La*b* space from the input profile, and performs color conversion on input images by using the LUT. When the input color space notified to the color conversion process 209 is a La*b* space, output profile information for converting a La*b* space to an output device-dependent output color space is also notified. In this case, the color conversion process 209 creates a LUT for mapping a La*b* color space to an output color space from the output profile, and performs color conversion on input images by using the LUT. When both the input color space and output color space notified to the color conversion process 209 are device-dependent color spaces, both an input profile and an output profile are notified. In this case, the color conversion process 209 creates a LUT for directly mapping an input color space to an output color space from the input profile and the output profile, and performs color conversion on input images by using the LUT. In the color conversion process 209, if the CMM 130 is provided inside the device, color conversion is performed by setting generated LUTs in the CMM 130 and using the CMM 130. If, on the other hand, the CMM 130 is not provided, the CPU 105 performs the color conversion process through software. The color conversion process 209 executes color conversion in advance on reference images, and thereby holds the time period required for color conversion process when only an input profile has been designated. The color conversion process 209 also holds the time period required for color conversion when only an output profile has been designated. The color conversion process 209 also holds the time period required for color conversion when an input profile and an output profile have been designated.

A RIP process 211 interprets a page description language (PDL) based on an instruction from the job control process 201, and controls the RIP unit 116 to perform rendering, thereby expanding it to a bitmap image.

Figure 3:
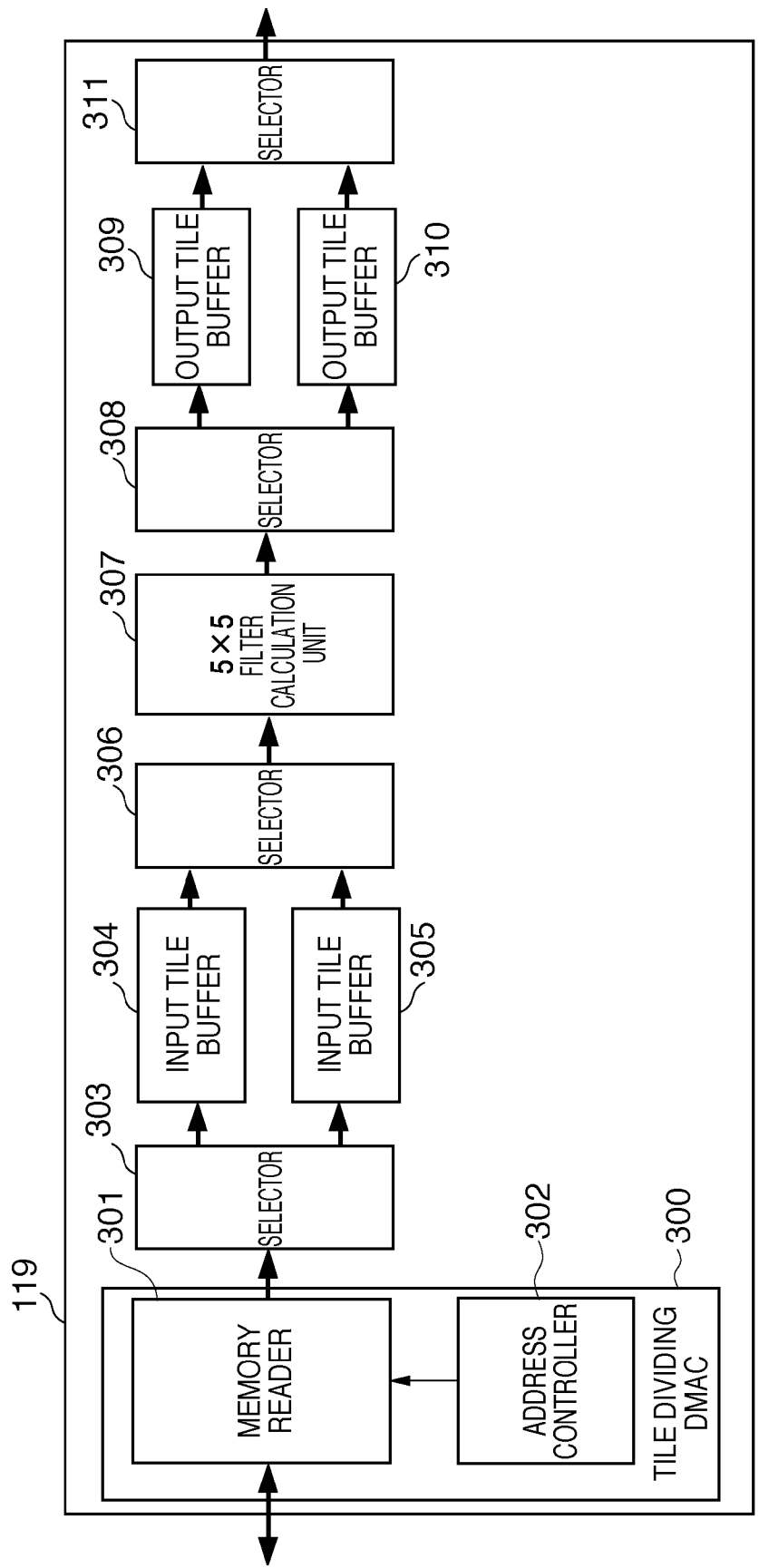
FIG. 3 is a block diagram describing a configuration of a printer image processor according to an embodiment of the present invention.

FIG. 3 is a block diagram describing a configuration of the printer image processor 119 according to the present embodiment.

A tile dividing DMAC 300 includes a memory reader 301 and an address controller 302. When reading original image data from the RAM 106, an address is generated by the address controller 302, a read request transaction is issued to the RAM 106 based on the generated address by the memory reader 301, and the data is read from the RAM 106.

Figure 5:
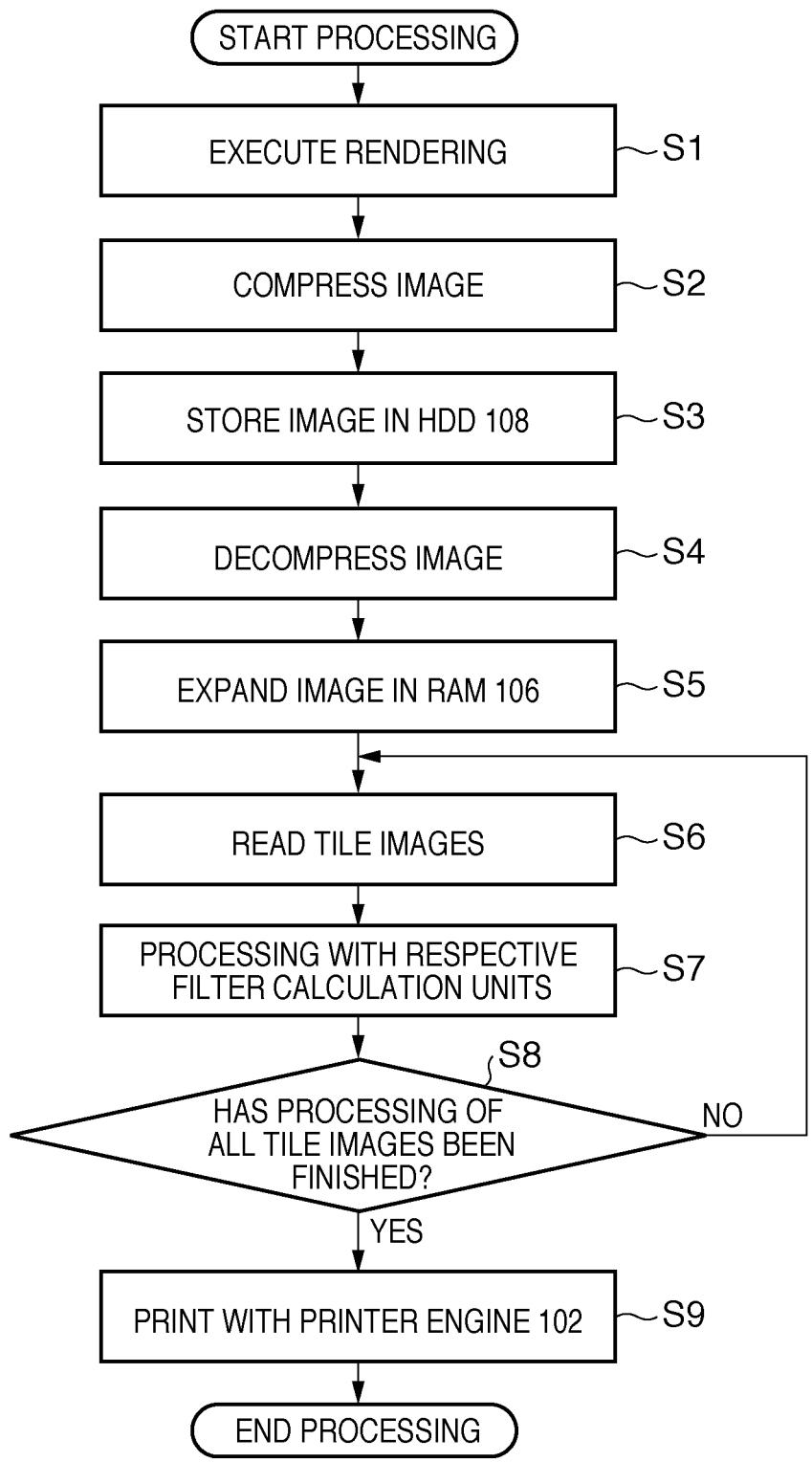
FIG. 5 is a flowchart describing a print processing of the image processing apparatus.

FIG. 5 is a flowchart describing a print processing of the image processing apparatus 100 according to the present embodiment. This process is implemented by the CPU 105 executing a program stored in the RAM 106 or the ROM 107.

A page description language (PDL) transmitted via the LAN 10 is received by the network I/F 111, and then input into the RIP unit 116 via the image bus I/F 114. Then, in step S1, the RIP unit 116 interprets the PDL and executes rendering. Next, in step S2, bitmap image data that has been rendered in step S1 is transmitted to the image compression unit 103 via the image bus 115, and is encoded in a predetermined image compression format by the image compression unit 103. Then, in step S3, a group of pages of each job is stored in the HDD 108 via the image bus I/F 114. In step S4, the group of pages thus stored in the HDD 108 is invoked in synchronization with the output timing of the printer engine 102, transmitted to the image decompression unit 121 via the image bus I/F 114 and the device I/F unit 117, and decoded (decompressed). In step S5, the image data thus restored is temporarily expanded in the RAM 106 in units of pages. The image data thus expanded is read by the tile dividing DMAC 300 of the printer image processor 119, which will be described later, at the timing when the page is printed, and image processing for printing is executed by the printer image processor 119. In step S6, tile images are read from the RAM 106. Next, in step S7, image processing is executed on the tile images by respective filter calculation units in units of tiles (in units of blocks). Then, in step S8, when the processing of all tile images has been finished, the process advances to step S9, where the processed image data is output to the printer engine 102 and printed.

Figure 4:
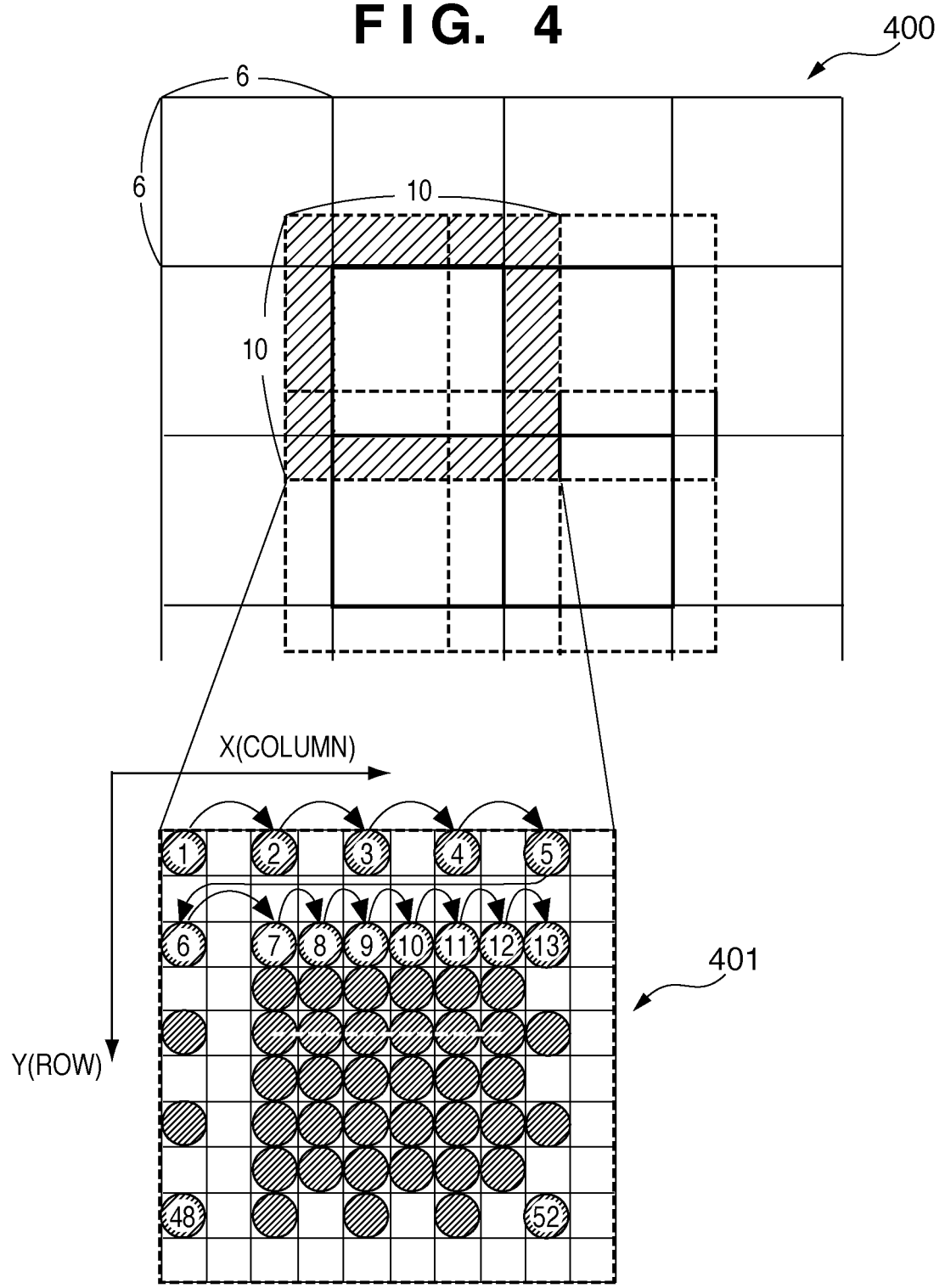
FIG. 4 is a diagram describing addresses generated by an address controller according to a first embodiment.

FIG. 4 is a diagram describing addresses generated by the address controller 302.

The diagram shows an example in which 10×10 tile data obtained by adding an overlap tile image composed of two pixels added to the periphery of 6×6 tile data is read. Reference numeral 400 indicates expanded image data arrayed in the RAM 106. The hatched portion indicates an overlap portion (first region), and the regions surrounded by the dotted lines are tile portions (blocks) that actually include an overlap portion. In order to divide an image into a plurality of tiles, the address controller 302 performs address control such that the image data of a tile portion including the overlap portion indicated by hatching is read in the order described below. Accordingly, the image data of the overlap portion indicated by hatching is read in duplicate. Furthermore, in an enlarged view of a tile portion indicated by 401, hatched circles indicate image data that is actually read, and the number in each hatched circle indicates the order in which the data is read. In other words, as shown in FIG. 4, all of 6×6 tile data constituting a substance region (second region) and the pixel (for example, the pixels of "1" to "5", "6", "13", "48" and "52") located at the upper left of each 2×2 block in the overlap portion are read.

Figure 6:
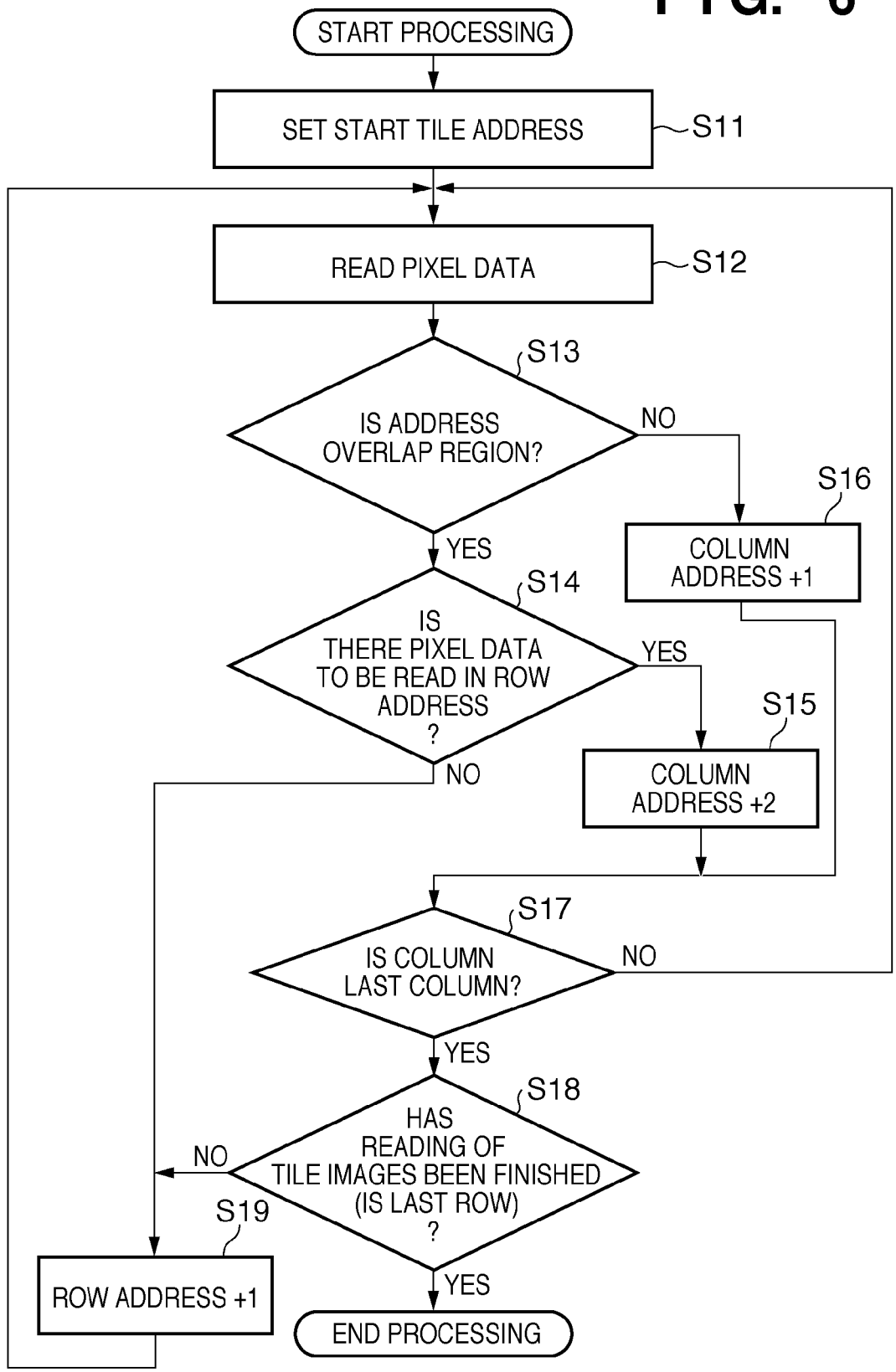
FIG. 6 is a flowchart describing address control of the address controller.

FIG. 6 is a flowchart describing address control (step S6 of FIG. 5) for reading a tile image including an overlap portion performed by the address controller 302.

The address controller 302 first determines and controls the position of a tile by using a column address (X direction) and a row address (Y direction) as shown in FIG. 4. Firstly, in step S11, the address of pixel data located at the upper left of the tile is set as a start tile address. Next, in step S12, pixel data is read from the address set as a start tile address. Next, in step S13, it is determined whether or not the address generated by the address controller 302 is an overlap portion. If it is determined that the address is an overlap portion, the process advances to step S14, where the row (Y direction) address is determined, and then it is determined whether or not there is pixel data to be read in the row. If it is determine din step S14 that there is no pixel data to be read, the process advances to step S19, where the row address (Y) is incremented by one, and the process advances to step S12. If, on the other hand, it is determined in step S14 that there is pixel data to be read, the process advances to step S15, where the column address (X) is incremented by two, and the process advances to step S17. In step S17, it is determined whether or not the column is the last column. If it is determined in step S17 that the column is not the last column, the process returns to step S12, where pixel data is read.

If, on the other hand, it is determined in step S13 that the address is not an overlap portion, the process advances to step S16, where the column address (X) is incremented by one, and the process advances to step S17, where the pixel data read processing is repeated. Then, in step S17, if it is determined that the column is the last column in the tile including an overlap portion, the process advances to step S18, where it is determined whether the currently read row is the last row in the tile including an overlap portion. If it is determined that the currently read row is not the last row, the process advances to step S19, where the row address is incremented by one, the reading column returns to the first column, and the pixel data read processing is repeated. If it is determined in step S18 that the currently read row is the last row, it means that the reading of the tile image including an overlap portion has been finished, and thus this process ends.

As described above, in the first embodiment, as shown in FIG. 4, in the overlap portion including two pixels in the periphery, an address to be read is generated by the address controller 302 reading only the pixel (representative pixel) located at the upper left of each 2×2 rectangle (small block). Such representative pixels correspond to, for example, D0 to D4, D5, D12, D19, D26, D33, D46, and D47 to D51 shown in FIG. 7. In this manner, the resolution of the overlap portion can be reduced. It is also possible to generate tile images by performing address control such that the data arranged in one page can be read in units of tiles. In this manner, items of the read tile data are input and stored in input tile buffers 304 and 305 shown in FIG. 3. A selector 303 sequentially stores data by switching between the input tile buffers 304 and 305.

FIG. 7 is a diagram describing a calculation process for a pixel D22 of interest performed by a 5×5 filter calculation unit 307 according to the present embodiment. FIG. 9 shows an example of calculation coefficients CA00 to CA08.

The present embodiment employs a double buffer configuration including the input tile buffers 304 and 305 as shown in FIG. 3. With this configuration, for example, the memory reader 301 can write data into the input tile buffer 305 while data is read from the other input tile buffer 304 to the 5×5 filter calculation unit 307 via a selector 306, as a result of which throughput can be increased. The 5×5 filter calculation unit 307 is a calculation processor that performs filter calculation on tile data.

Figure 8:
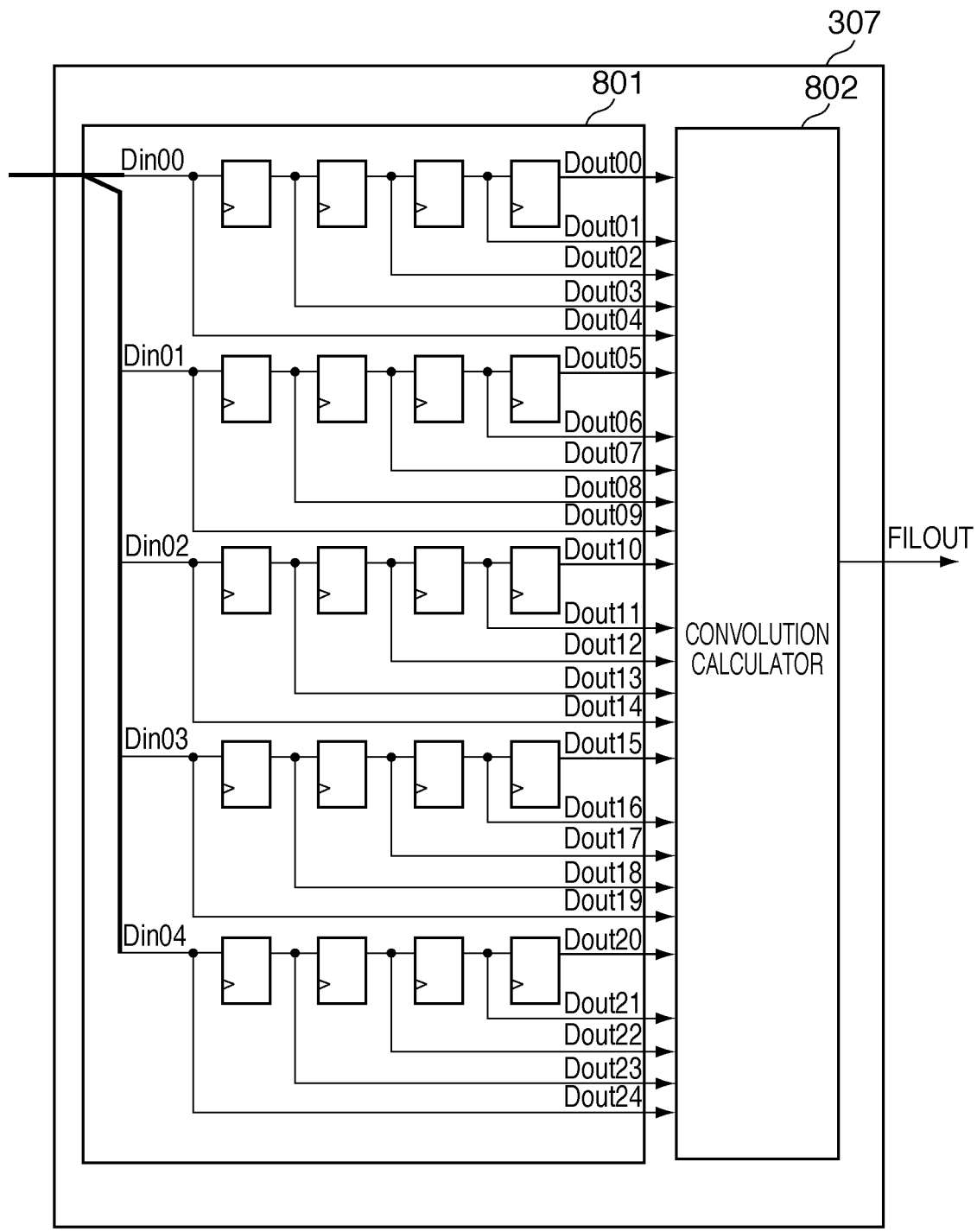
FIG. 8 is a block diagram describing an internal configuration of the 5×5 filter calculation unit.

FIG. 8 is a block diagram describing an internal configuration of the 5×5 filter calculation unit 307. In the present embodiment, a configuration that performs 5×5 filter calculation is shown, and the 5×5 filter calculation unit 307 includes a register group 801 and a convolution calculator 802. The pixel data stored in the input tile buffers 304 and 305 are sequentially input to the 5×5 filter calculation unit 307 that performs 5×5 filter calculation. In the present embodiment, five pixels in the vertical direction of a 5×5 block are simultaneously input to input ports Din00 to Din04 of first registers, and this input processing is repeated five times so that pixel data necessary for 5×5 filter calculation is stored in all of the registers included in the register group 801. After that, filter calculation is executed by the convolution calculator 802 by using outputs (Dout00 to Dout24) from the registers in the register group 801.

FIG. 9 is a diagram showing an example of filter coefficients used for filter calculation performed by the 5×5 filter calculation unit 307.

To obtain the pixel D22 of interest through calculation, the corresponding peripheral pixels are multiplied by filter coefficients (CA00 to CA08) for the pixel D22 of interest. Then, the total of 5×5 filter pixels is obtained by using the results of each calculation, and the calculation for the pixel of interest ends.

FIG. 10 is a diagram describing filter calculation for a pixel D6 of interest.

As shown in the diagram, for example, the pixel diagonally to the upper left of the pixel D6 does not actually have pixel data to be processed because only representative pixels have been read by thinning out pixels in the previous tile image reading. In this case, calculation is performed by using a pixel D0 as a reference pixel, and the pixel located immediately above the pixel D6 and the pixel diagonally to the upper right of the pixel D6 refer to a pixel D1 (for example, the representative pixel within an area indicated by the thick line in the diagram is used as a reference pixel).

As described above, when calculation is performed for an edge pixel of a substance portion (a portion that does not overlap), if there is no pixel data in the position of the reference pixel, filter calculation is performed for the pixel of interest using the pixel data of neighboring pixels. In this manner, filter calculation can be executed by using reference pixels in the overlap portion having a low resolution (upper left pixel is only referred).

The pixel data in the substance portion for which filter calculation for the pixel of interest has been finished is written into an output tile buffer 309 or 310 via a selector 308 shown in FIG. 3. When either the output tile buffer 309 or 310 becomes full, transmission of output tiles is enabled, and tile images are output via a selector 311.

In this manner, in step S6 of FIG. 5, tile image data is read from the RAM 106. In step S7, filter calculation is executed on the tile image data read in step S6. Then, in step S8, it is determined whether or not the reading of all tile images of the image data expanded in the RAM 106 has been finished. If the reading has not been finished, the process returns to step S6. If it is determined that the reading has been finished, the process advances to step S9. In step S9, the image data output from the printer image processor 119 is output to the printer engine 102. Then, images are printed onto paper, and the process ends.

As described above, according to the first embodiment, when reading (acquiring) expanded bitmap image data from the RAM 106, the image data is read including an overlap portion (first region), the resolution of the overlap portion is lowered, and then the image data is read. Furthermore, the overlap portion is tile-divided in a format with a resolution relatively lower than that of the substance (second region). Thus, when filter calculation that refers to peripheral pixels is performed, the amount of data when transferring image data from the RAM 106 in units of tiles including an overlap portion can be reduced. Accordingly, it is possible to suppress the bandwidth of the RAM 106, as well as the increase in the cost of the system bus, image bus and the like, as a result of which an image processing apparatus with good performance can be provided.

In the first embodiment, filter calculation is performed by the filter calculation unit 307 of the printer image processor 119, but it is also possible to employ a configuration in which processing units that perform color conversion, various types of screen processing and the like are mounted, and these processing units perform processing serially or in parallel.

The second embodiment of the present invention will be described next. The overall configuration of an image processing apparatus and software modules according to the present embodiment are the same as those of the first embodiment described above, and thus descriptions thereof are omitted here. The second embodiment will be described in the context where print processing has two modes.

Figure 11:
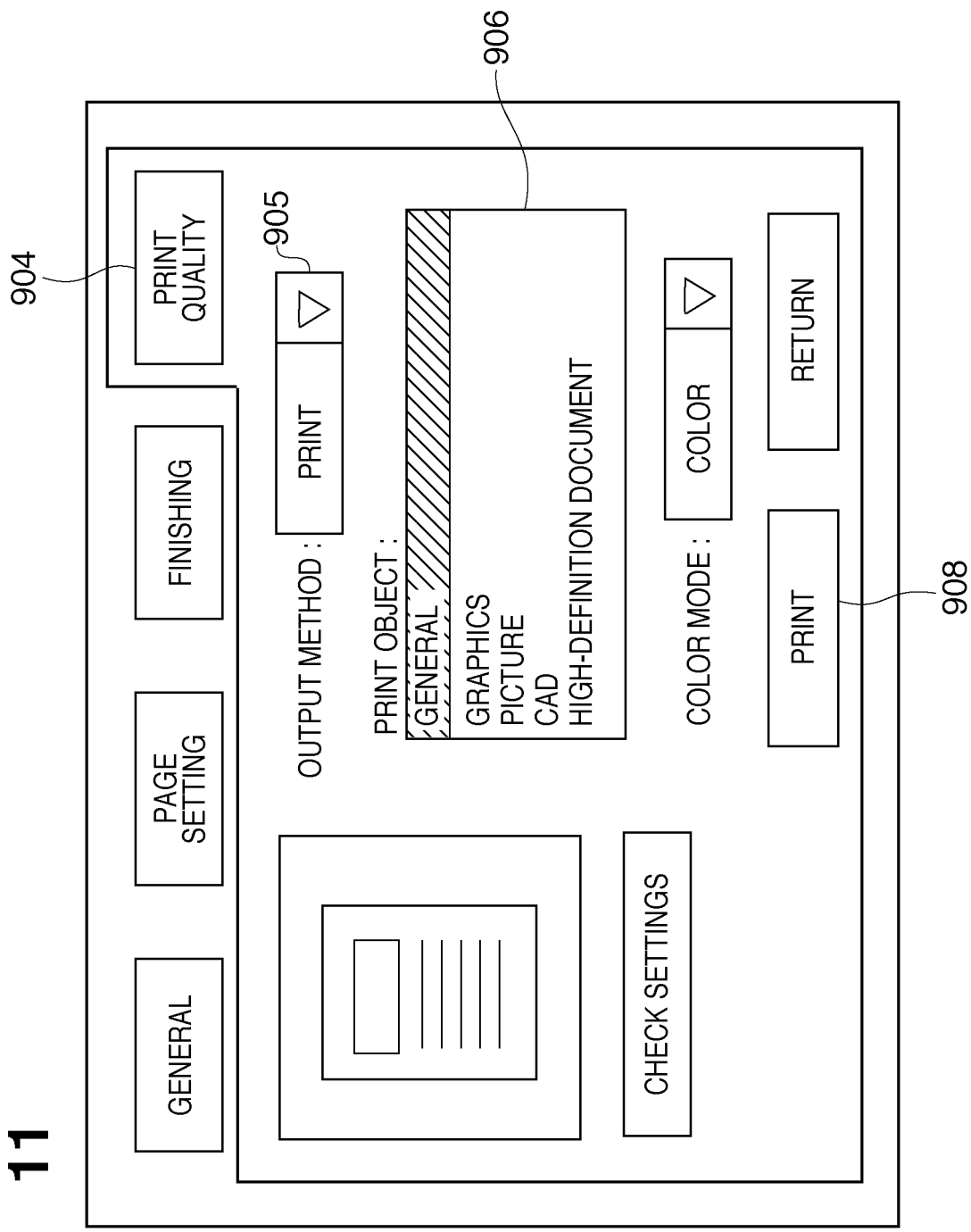
FIG. 11 is a diagram describing an example of a screen display of a printer driver.

FIG. 11 is a diagram showing an example of a screen display of a printer driver when the user performs print processing. This screen is displayed on a display unit of a PC (not shown) connected to the image processing apparatus 100 via the LAN 10.

FIG. 11 depicts a view illustrating an example of a screen display when the user has selected a print quality tab 904 to select print quality. Here, the user can select one of print, saving on storage, secure print and the like by using an output method dialog 905. A print object dialog 906 is used to select a target to be printed or saved, and print quality is selected according to the selected target. As shown in the diagram, when "General" has been selected, performance-critical settings (fast print speed and fast storage speed) are set, and when "Graphics" or "High-Definition Document" has been selected, image quality-critical settings are set. Thereafter, the image processing apparatus 100 performs operations based on the settings thus set.

Figure 12:
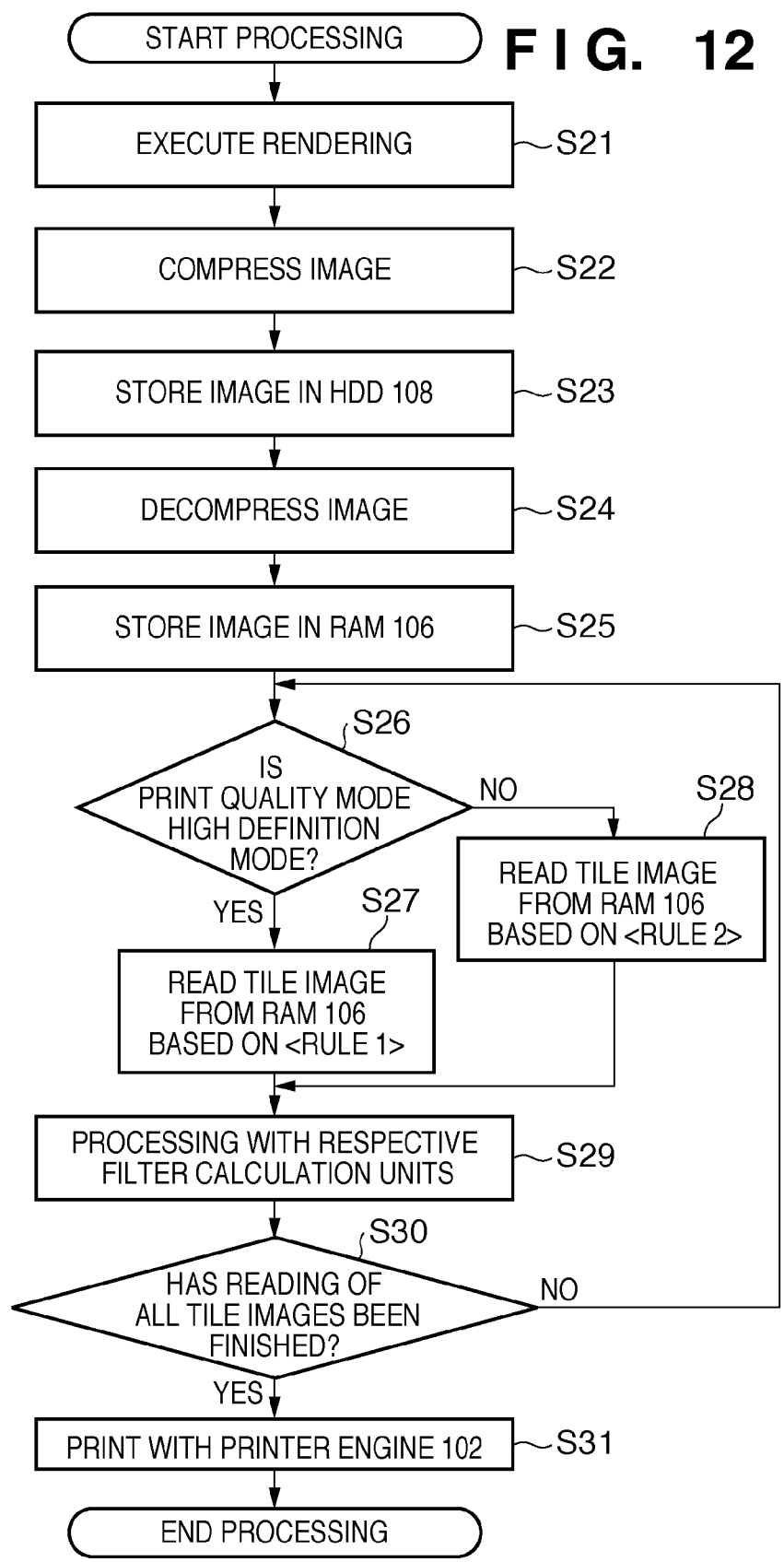
FIG. 12 is a flowchart describing a print processing of an image processing apparatus according to a second embodiment.

Next, a process performed when the user has selected "High-Definition Document" in the print object dialog 906 to issue a print instruction will be described with reference to the flowchart of FIG. 12. FIG. 12 is a flowchart describing a print processing of the image processing apparatus 100 according to the second embodiment.

When "High-Definition Document" has been selected in the print object dialog 906 of FIG. 11, and a print button 908 has been pressed, print data is transmitted in a page description language (PDL) from a PC connected to the LAN 10. This PDL data is received by the network I/F 111, and input to the RIP unit 116 via the image bus I/F 114. In step S21, the RIP unit 116 interprets the PDL data and executes rendering. Next, in step S22, the expanded image data is encoded (compressed). Then, in step S23, a group of pages of each job is stored in the HDD 108 via the image bus I/F 114. Next, in step S24, the stored group of pages is read in synchronization with the output timing of the printer engine 102, and then decoded and decompressed. Next, in step S25, the image data thus restored is temporarily stored in the RAM 106 in units of pages.

Next, in step S26, the print quality mode of the stored image data is checked. If it is determined in step S26 that the print quality mode is high definition mode, the process advances to step S27, where image data is read in accordance with <RULE 1> of a printer image processor 119, which will be described later. If, on the other hand, it is determined in step S26 that the print quality mode is not high definition mode, the process advances to step S28, where image data is read in accordance with <RULE 2> of the printer image processor 119, which will be described later.

When image data has been read in step S27 or S28 in the manner described above, the process advances to step S29, where a filter calculation process is executed on the image data. Then, in step S30, when the processing of all tile images has been finished, the process advances to step S31, where the image data is output to the printer engine 102 and printed. If the processing of all tile images has not been finished in step S30, the process returns to step S26, and the above process is executed.

Figure 13:
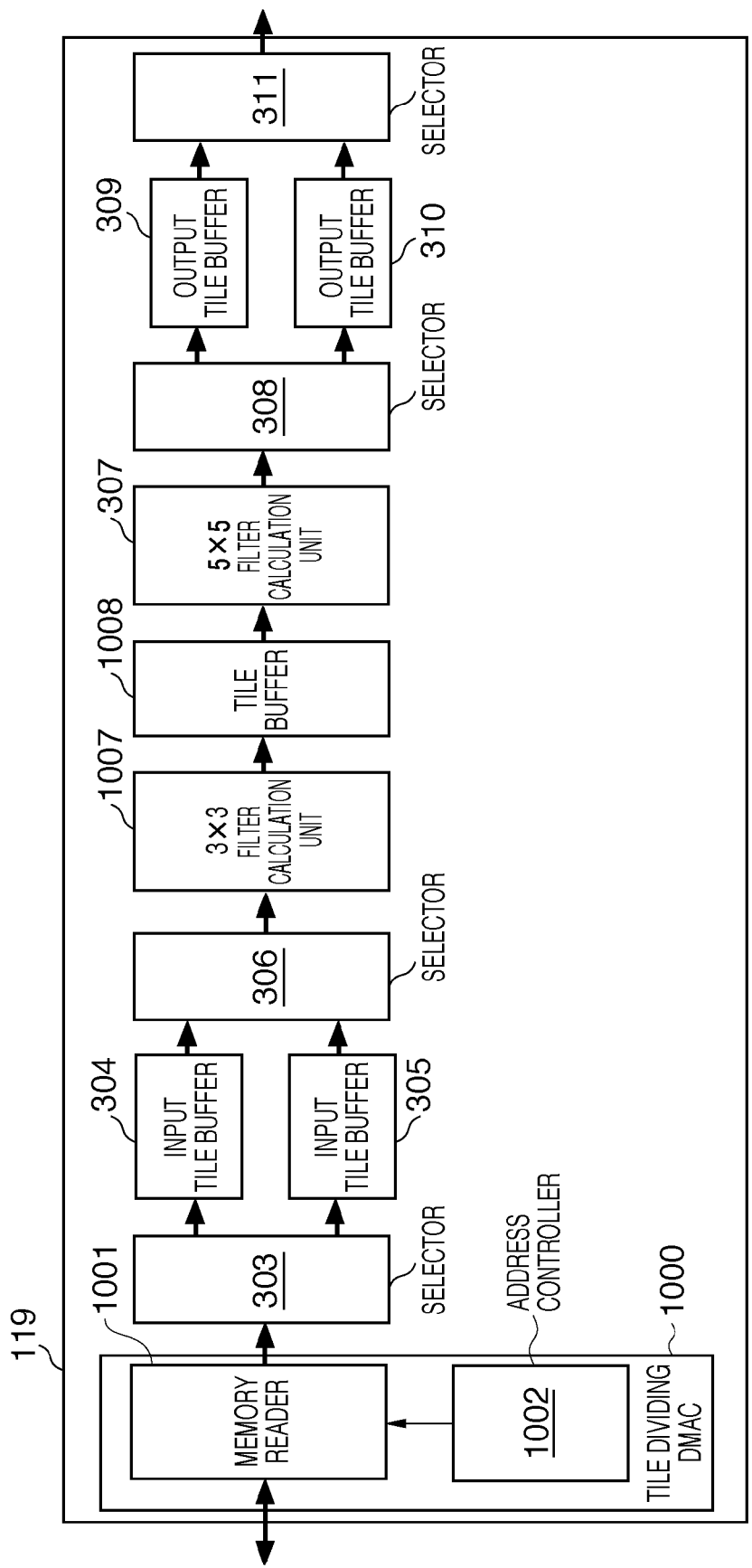
FIG. 13 is a block diagram describing a configuration of a printer image processor according to the second embodiment.

FIG. 13 is a block diagram showing a configuration of the printer image processor 119 according to the second embodiment. In the second embodiment, in addition to the 5×5 filter calculation unit 307 described in the first embodiment, a 3×3 filter calculation unit 1007 is added. Also, a tile buffer 1008 is provided between the 3×3 filter calculation unit 1007 and the 5×5 filter calculation unit 307. In addition, in the second embodiment, a tile dividing DMAC 1000 including a memory reader 1001 and an address controller 1002 is used in place of the tile dividing DMAC 300 of FIG. 3. The other constituent elements are the same as those of FIG. 3, and thus the same reference numerals are given and descriptions thereof are omitted here.

Figure 14:
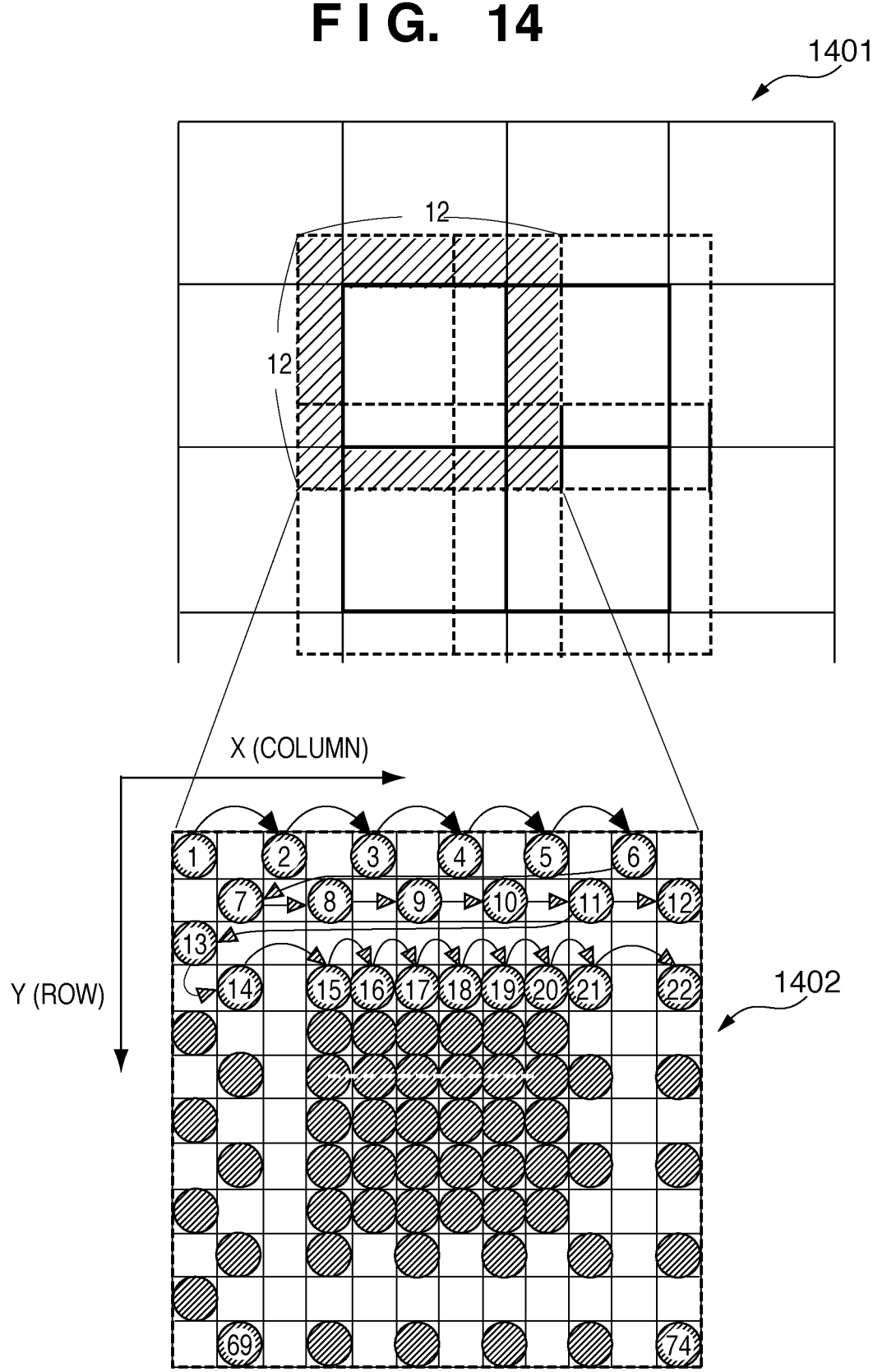
FIG. 14 is a diagram describing address control performed by an address controller according to the second embodiment.

FIG. 14 is a diagram describing address control performed by the address controller 1002 according to the second embodiment. Unlike the first embodiment described above, in the second embodiment, 3×3 filter calculation is performed on 6×6 tile data, and thereafter 5×5 filter calculation is performed. Accordingly, 12×12 tile data in total is read in which two pixels have been added to the periphery of the substance portion of the first embodiment, and one pixel has been further added to the periphery of the overlap portion in order to perform 3×3 filter calculation of the second embodiment. That is to say, the overlap portion includes a plurality of types of sub-regions (two types of overlap portions in this example), and each sub-region is divided into a plurality of small blocks.

In FIG. 14, reference numeral 1401 indicates expanded image data arrayed in the RAM 106. In the diagram, the hatched portion indicates an overlap portion, and a region surrounded by a dotted line indicates a tile portion that actually includes an overlap portion.

In order to divide an image into a plurality of tile images as in the first embodiment, the address controller 1002 performs address control such that the pixel data of a tile including the overlap portion indicated by hatching in the diagram is read in the order described below. Accordingly, the pixel data of the overlap portion indicated by hatching is read in duplicate. Furthermore, in an enlarged view of a tile portion indicated by 1402 in FIG. 14, the number in each hatched circle indicates the order in which the pixel data is actually read.

Figure 15:
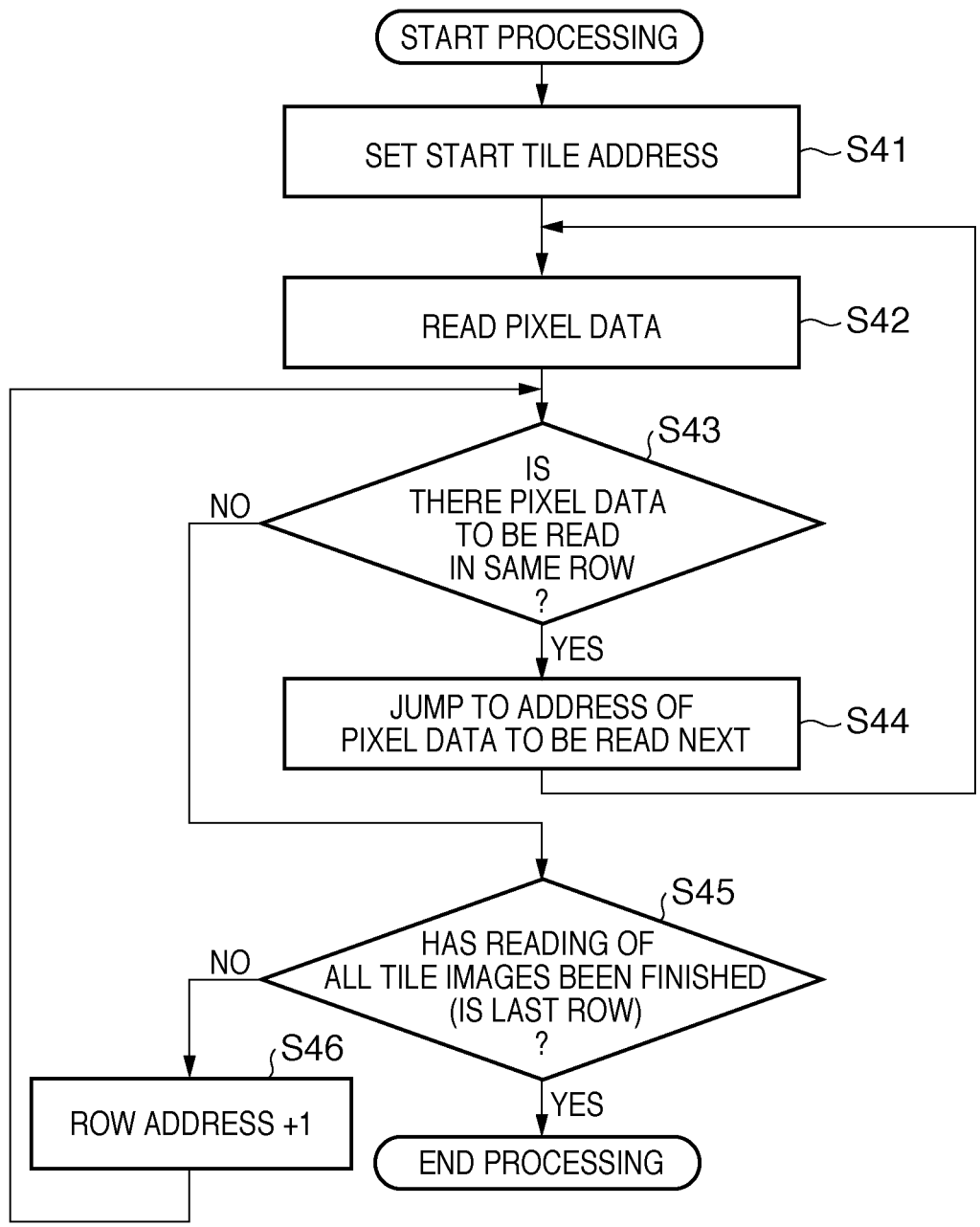
FIG. 15 is a flowchart describing address control for reading a tile image performed by the address controller.

FIG. 15 is a flowchart describing address control for reading a tile image including an overlap portion performed by the address controller 1002 according to the second embodiment. In the second embodiment as well, the address controller 1002 determines and controls the position of a tile by using two addresses, a column address (X direction) and a row address (Y direction) as shown in FIG. 14.

Firstly, in step S41, the address of pixel data located at the upper left of the tile is set as a start tile address. Next, in step S42, the pixel data set by the start tile address is read. Subsequently, in step S43, the current address generated by the address controller 1002 is checked to determine whether or not there is pixel data to be read in the row indicated by the current row address. If there is pixel data to be read, the process advances to step S44, where the column address is incremented so as to address the pixel data to be read. Then, the process returns to step S42, where the pixel data read process is repeated to read all of the pixel data to be read in the row. In step S43, if all of the pixel data in the row has been read, the process advances to step S45, it is determined where whether or not the current row is the last row. If it is determined in step S45 that the current row is not the last row, the process advances to step S46, where the row address is incremented by one, and the process advances to step S43, where the processing to read the pixel data in the row is repeated in the same manner as above. Then, in step S45, if it is determined that the current row is the last row, the tile image reading process ends.

As described above, according to the second embodiment, when the print quality mode has been set to "High-Definition Document", in the overlap portion including two pixels in the periphery (the second and third portions from the outermost periphery in FIG. 14), a representative pixel to be read is selected based on, for example, the pixel located at the upper left of each 2×2 rectangle (as in the first embodiment). Then, as described in FIG. 15, addresses are generated and pixel data is sequentially read (the representative pixels corresponding to, for example, D6 to D10, D13, D20, D29, D36, D45, D52, and D61 to D65 of FIG. 16). Similarly, in the overlap portion for 3×3 filter calculation (the outermost periphery portion in the diagram), representative pixels are selected based on certain rules (in the case of FIG. 14, the pixel located on the left or right edge is selected in a 2×1 rectangle, and the pixel located on the upper or lower edge is selected in a 1×2 rectangle). Addresses are generated accordingly, and the pixel data is sequentially read in the same manner (the representative pixels corresponding to, for example, D0 to D5, D12, D11, D22, D21, D38, D37, D54, D53, D67, D66, and D68 to D73 of FIG. 16).

As described above, when there are, for example, two filter calculations, representative pixels of the corresponding overlap portion are determined by using addresses generated based on different rules, and items of the pixel data of the representative pixels are read, whereby tile division is possible such that the resolution differs depending on the overlap portion. When a high definition mode such as "High-Definition Document" has been set, for example, the resolution of pixel data to be read in the outer periphery is set higher than that of the next overlap portion (the second and third portions from the outermost periphery). Consequently, the improvement of image quality through filter calculation is achieved, making it possible to reproduce images of higher image quality.

Accordingly, when a high definition mode such as "High-Definition Document" has been set, the address controller 1002 reads the data arrayed in the RAM 106 by using the memory reader 1001 based on addresses generated based on the above-described rules (<RULE 1> in FIG. 12) (step S27). The overlap tile data thus read is stored in either the input tile buffer 304 or 305 via the selector 303. When the tile buffer becomes full of the tile data, the data is transferred to the 3×3 filter calculation unit 1007. The internal configuration of the 3×3 filter calculation unit 1007 is substantially the same as that of the filter calculation unit 307 (FIG. 8) of the first embodiment described above, and thus a description thereof is omitted here.

Similarly, the data is sequentially stored in a group of registers (not shown) of the 3×3 filter calculation unit 1007, and when a total of nine pixels of the 3×3 filter has been stored in the registers, 3×3 filter calculation is executed by a convolution calculator (not shown).

Figures 16, 17:
FIG. 16 is a diagram describing filter calculation for a pixel of interest D24 according to the second embodiment.
FIG. 17 is a diagram describing an example of filter coefficients used in 3×3 filter calculation.

The filter calculation equation shown in FIG. 16 shows an example in which calculation is performed using pixel D24 of FIG. 16 as a pixel of interest.

FIG. 17 is a diagram showing an example of filter coefficients used in 3×3 filter calculation.

As shown in FIG. 16, in the case of performing calculation for the pixel D24 of interest, the pixel data of the corresponding peripheral pixels are multiplied by filter coefficients (CA00 to CA03) for the pixel of interest. Then, the total of 3×3 filter pixels is obtained by using the results of each calculation, and the calculation for the pixel of interest ends.

Figure 18:
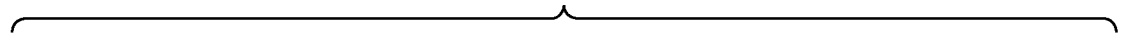
FIG. 18 is a diagram describing filter calculation for a pixel of interest D6 according to the second embodiment.

On the other hand, the filter calculation equation shown in FIG. 18 shows an example in which calculation is performed for a pixel D6 of interest. As shown in the diagram, for example, the pixel located immediately above the pixel D6 of interest does not have data to be processed. In this case, calculation with a coefficient CA01 is performed using pixel D0 as a reference pixel, and the pixel located on the right side of the pixel D6 of interest, the pixel immediately below the pixel D6 and the pixel diagonally to the lower right refer to the pixel D6 in calculations with respective coefficient CA01, CA02 and CA03 (for example, the reference pixel refers to pixels in an area indicated by a thick line and equation in FIG. 18).

As described above, when there is no data in the reference pixel position in the case of performing calculation of an edge pixel of the substance portion (a portion that does not overlap), calculation for the pixel of interest is performed using the pixel data of neighboring pixels. It is thus possible to execute filter calculation using an overlap portion having a low resolution as a reference pixel.

After execution of 3×3 filter calculation, the tile data resulting from calculation is temporarily stored in the tile buffer 1008. At this time, the overlap portion in the outermost periphery that was used for 3×3 filter calculation is no longer necessary, and therefore this portion is deleted when the tile data is input to the next 5×5 filter calculation unit 307. Accordingly, the 12×12 tile is changed to a 10×10 tile and input as in the first embodiment. The tile data input to the 5×5 filter calculation unit 307 is subjected to the same process as in the first embodiment. The pixel data in the substance portion resulting from the filter calculation for the pixel of interest is written into the output tile buffer 309 or 310 via the selector 308. Then, when either the output tile buffer 309 or 310 becomes full, transmission of the tile data is enabled, and the tile data is output via the selector 311.

Accordingly, while executing filtering in each filter calculation unit of the printer image processor 119 in step S29 of FIG. 12, it is determined in step S30 in FIG. 12 whether or not the reading of all tile images of the image data expanded in the RAM 106 has been finished. If the reading of all tile images has been finished, the process advances to step S31, where the image data output from the printer image processor 119 is input to the printer engine 102, whereby images are printed onto paper, the paper is discharged, and the print processing ends.

Next, an example will be described in which the user has set "General" (speed priority mode) in the print object dialog 906 of FIG. 11 for printing. The processes performed until image data to be printed is expanded in the RAM 106 are the same as those when "High-Definition Document" (image quality priority mode) is selected, and thus descriptions thereof are omitted here.

Figure 19:
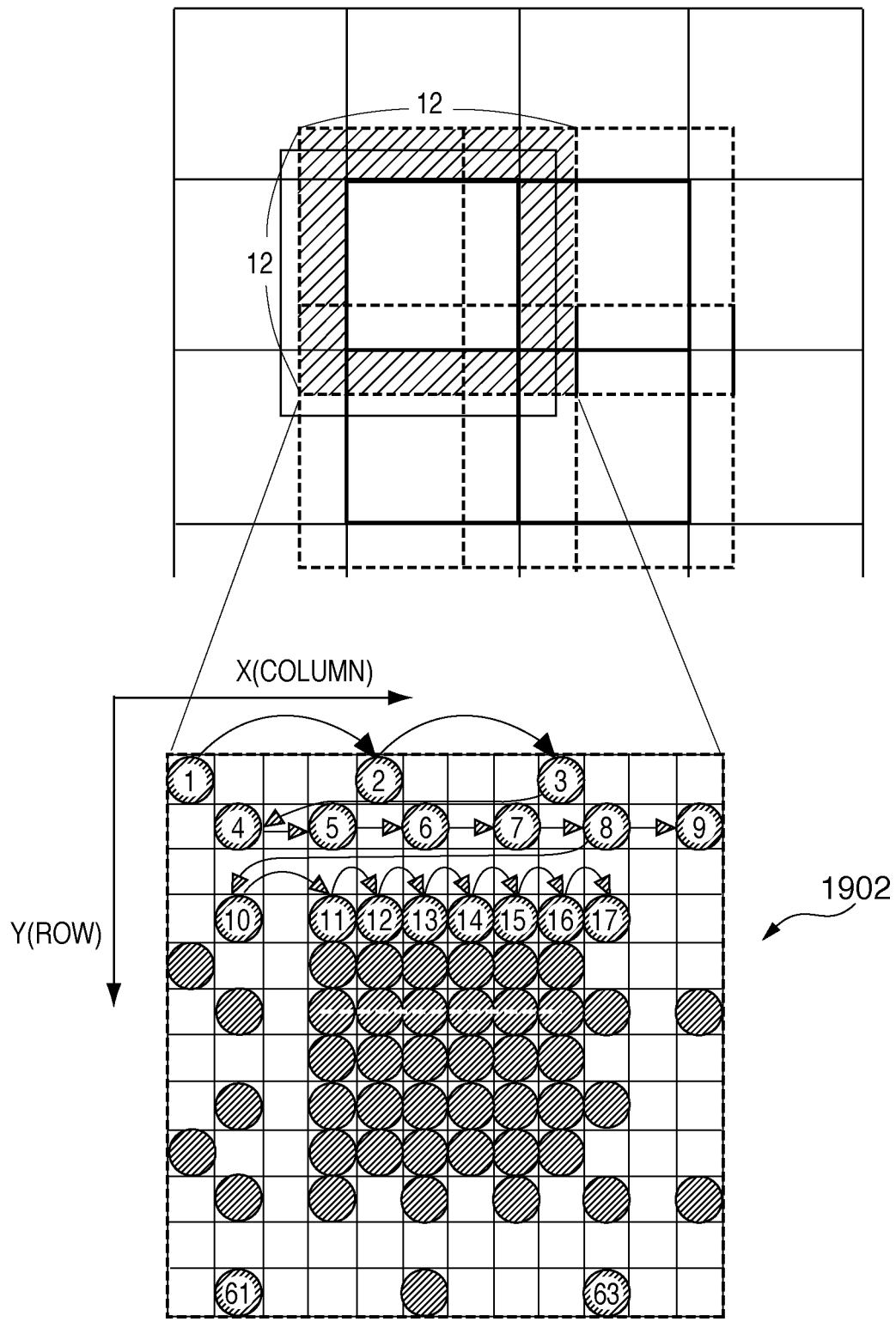
FIG. 19 is a diagram describing addresses generated by an address controller according to the second embodiment.

In an enlarged view of a tile portion indicated by 1902 in FIG. 19, the number in each hatched circle indicates the order in which pixel data is actually read. Address generation and control by the address controller 1002 performed in this mode is the same as that of the flowchart of FIG. 15, and thus a description thereof is omitted here.

As shown in FIG. 19, in the overlap portion including two pixels in the periphery that is used for 5×5 filter calculation (the second and third portions from the outermost periphery in FIG. 19), a representative pixel to be read is selected based on certain rules (in the case of FIG. 19, the pixel located at the upper left of each 2×2 rectangle is read) as shown in the diagram. Then, addresses are generated based on the selected pixels, and the pixel data is sequentially read (the representative pixels corresponding to, for example, D3 to D7, D9, D16, D24, D31, D39, D46, and D54 to D58 in FIG. 20). Similarly, in the overlap portion used for 3×3 filter calculation (the outermost periphery portion in FIG. 19), a representative pixel is selected based on certain rules (in this case, the pixel located on the left or right edge of a 4×1 rectangle is selected, or the pixel located on the upper or lower edge of a 1×4 rectangle is selected). Then, addresses are generated to read the selected pixel data (the representative pixels corresponding to, for example, D0 to D2, D17, D8, D47, D32, and D59 to D62 in FIG. 20).

As described above, when there are, for example, two filter calculations, representative pixels of the corresponding overlap portion are determined from addresses generated based on different rules, and items of the pixel data of the representative pixels are read, whereby tile division is possible such that the resolution differs depending on the overlap portion. When a performance-critical mode such as "General" has been set, for example, the resolution of the pixels to be read in the outer periphery is set lower than that when "High-Definition Document" has been selected as described above. Specifically, one pixel is selected in a 4×1 rectangle. Although the accuracy of 3×3 filter calculation is thereby reduced, small tile data can be obtained, as a result of which the throughput when reading the data from the RAM 106 increases, and performance can be improved.

As described above, in the speed priority mode such as "General", the address controller 1002 reads original image data from the RAM 106 via the memory reader 1001 based on the addresses generated based on the above-described rules (<RULE 2> in FIG. 12) (step S28).

FIGS. 20 and 21 are diagrams describing examples in which the 3×3 filter calculation unit 1007 performs filter calculation for pixels D19 and D3, respectively.

In FIG. 21 in particular, the representative pixels in the outermost periphery are less than those when "High-Definition Document" has been selected as described above (FIG. 18), in the terms of the addition for obtaining "FILOUT_03", reference pixels are used in duplicate (see equation in FIG. 21). Accordingly, although the accuracy of calculation is lowered by an amount corresponding to the amount by which reference pixel data is reduced, the amount of tile data can be reduced.

After execution of 3×3 filter calculation in this manner, the tile data resulting from the calculation is temporarily stored in the tile buffer 1008 in FIG. 13. In the same manner as described above, the overlap portion in the outermost periphery that was used for 3×3 filter calculation is no longer necessary, and therefore this portion is deleted when the tile data is input to the next 5×5 filter calculation unit 307, as a result of which the 12×12 tile is changed to a 10×10 tile. The tile data input to the next 5×5 filter calculation unit 307 is subjected to the same process as in the first embodiment. The pixel data in the substance portion resulting from the filter calculation for the pixel of interest is written into the output tile buffer 309 or 310 via the selector 308. Then, when either the output tile buffer 309 or 310 becomes full, transmission of the tile data is enabled, and the tile data is output via the selector 311 (S29). Accordingly, while executing filtering in each filter calculation unit of the printer image processor 119 in step S29, it is determined in step S30 in FIG. 12 whether or not the reading of all tile images of the image data stored in the RAM 106 has been finished. If the reading of all tile images has been finished, the process advances to step S31, where the image data is output to the printer engine 102 and printed, and the print processing ends.

As described above, in the second embodiment, it is possible to perform control such that the resolution of the overlap portion is changed according to the print mode (image processing mode) set by the user and the image data is read when reading data from a page memory such as the RAM in which page images have been stored. Accordingly, the amount of data of tile images including overlap portions can be changed according to the print mode, whereby it is possible to suppress an increase of image data, and perform printing with the image quality and processing speed required by the user.

When there are a plurality of processes that require the printer image processor 119 to refer to peripheral pixels such as filter calculation as in the second embodiment, by configuring the overlap portion used for filter calculation to include a plurality of corresponding layers, it is possible to cope with a plurality of different filter calculation processes. Furthermore, by configuring the image processor to change the resolution of pixel data to be read according to the print mode or the like, a good performance process suitable for the mode set by the user or the like can be executed without broadening the data bandwidth between the image processor and the RAM.

In the first and second embodiments given above, image data is compressed in units of pages. Accordingly, in order to cut out a desired tile, the image data of one full page needs to be expanded in the RAM 106. For example, when A4-sized portrait image data is rotated 90 degrees or 270 degrees in order to print the data on A4-sized paper in landscape orientation, or even when rotation is unnecessary, it is necessary to decompress an (9 line+α) image in order to cut out a tile, for example, a 10×10 tile. As a result, the capacity of the RAM 106 used to decompress the image data increases.

To address this, in the third embodiment, when compressing image data in step S2 of FIG. 5, the image data is divided into tiles including an overlap portion, and then compressed in JPEG. At this time, in order to facilitate JPEG compression in units of processing, the substance portion and the overlap portion are configured to have a size that is a multiple of 8 in the vertical and horizontal directions. Under such restrictions, the size of the substance portion and the overlap portion is set to a size required in the processing (step S7) performed by the subsequent printer image processor 119. According to this method, in the image decompression step (step S24) of FIG. 12, only the necessary portion of one page can be expanded in the RAM 106, and the capacity of the RAM 106 required can be reduced.

In the third embodiment, each overlap portion is included in a tile that includes a plurality of overlap portions, and thus the compressed data will be large if compressed in an ordinary manner. To address this, in the third embodiment, the compression parameter is switched between the overlap portion and the substance portion, whereby the amount of data can be reduced while suppressing the influence on the final print quality.

Figure 23:
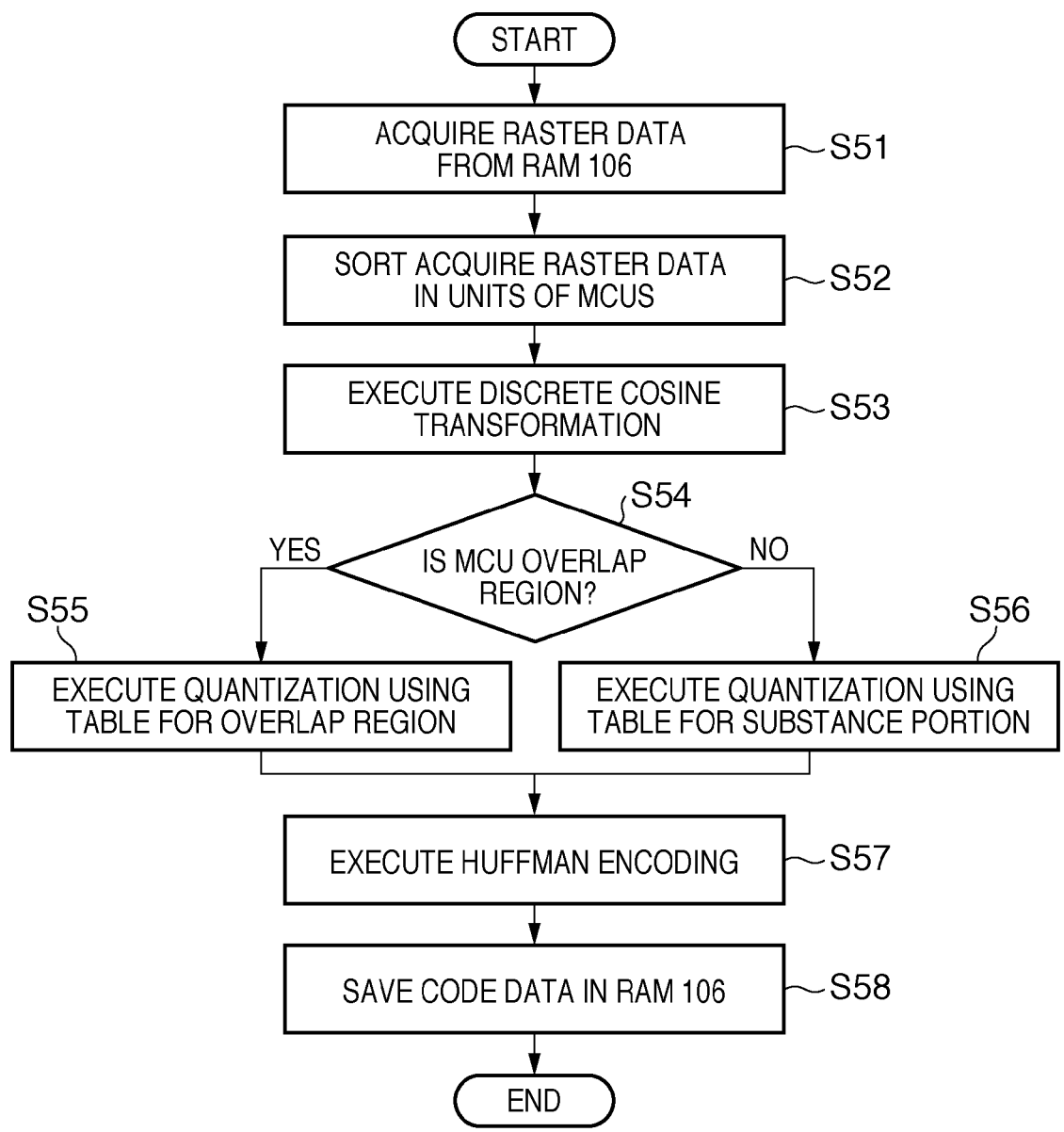
FIG. 23 is a flowchart describing a compression process performed by the image compression unit according to Embodiment 3.

FIG. 22A is a block diagram showing a configuration of an image compression unit 103 according to the third embodiment. FIG. 23 is a flowchart describing a compression process performed by the image compression unit 103 according to the third embodiment. A compression method will be described with reference to these drawings. This process is executed in step S2 of FIG. 5 or in step S22 of FIG. 12.

An MCU DMAC (hereinafter referred to as DMAC) 2401 cuts out and reads tiles including an overlap portion from bitmap data in the RAM 106 based on the designated size of the substance portion and overlap portion (step S51). JPEG compression is performed in units of what are called MCUs (Minimum Coded Unit) as shown in FIGS. 24A to 24C. Each MCU is constituted by 8×8 pixels, and is present in each component (R, G, B, C, M, Y, K and the like). FIGS. 24A to 24C show MCUs in R, G and B components, respectively.

Next, in step S52, the DMAC 2401 sorts the read bitmap images in units of MCUs. At this time, the DMAC 2401 determines whether each MCU is an overlap portion or a substance portion, generates a quantization table selection signal 2805 (FIG. 26) based on the result, and transmits the signal to the subsequent modules. Then, in step S53, each MCU is discrete cosine transformed to a two-dimensional frequency component by a discrete cosine transform unit (DCT unit) 2402.

After DCT shown in FIG. 25A shows an example in which an MCU has been discrete cosine transformed, and the MCU includes 8×8 pixels even after discrete cosine transformation. Each element indicates a frequency transformed coefficient value, and the value shown in the upper left corner indicates the coefficient value of a DC component, and the coefficient value shows a higher harmonic component toward the bottom right corner. Each of the MCUs thus frequency transformed is then quantized by a quantization unit 2403.

FIG. 26 is a block diagram showing a configuration of the quantization unit 2403 according to the third embodiment.

The quantization unit 2403 includes a quantization core unit 2801 that performs quantization by referring to a quantization table, and a selector 2802 that selects a quantization table used for quantization according to the selection signal 2805. Quantization tables 2803 and 2804 are respectively a quantization table for overlap MCU and a quantization table for (substance) MCU that is not an overlap MCU (FIG. 27B). The quantization table for overlap MCU can compress images with a compression ratio higher than the quantization table for (substance) MCU that is not an overlap MCU. If the selection signal 2805 is "0", the quantization table 2803 (FIG. 27A) is selected. If the selection signal 2805 is "1", the quantization table 2804 (FIG. 27B) is selected.

The quantization core unit 2801 performs quantization by dividing each element of the MCU by the corresponding quantization value. Here, a table in which quantization values corresponding to an 8×8 MCU are collectively written is referred to as a quantization table. FIGS. 27A and 27B show examples of the quantization tables. It is generally known that even when higher harmonic (frequency) component information is lost, it is not noticeable to the human eye, and therefore, greater (coarser) values are used for the quantization values corresponding to higher harmonic (frequency) components. Taking the table for overlap MCU shown in FIG. 27A as an example, the values become greater toward the bottom right corner. FIG. 27B shows a specific example of the quantization table 2804 for substance MCU.

In JPEG compression, given the nature of Huffman encoding of an encoding unit 2404, which will be described later, the quantization table values are preferably large because the size of compressed code data can be reduced. In other words, the size of compressed code data can be reduced by using a table having higher compression ratios. However, when quantization table values are increased, the amount of information lost also increases, as a result of which degradation is noticeable to the human eye. That is to say, image quality and the size of code data are traded off, and the factor therefor is a quantization table value, or in other words, a compression ratio.

The third embodiment focuses on the fact that the degree of influence on the final image data that has undergone the subsequent image processing is smaller in the overlap portion as compared to the substance portion, and thus different quantization table values are used for the overlap portion and the substance portion. Accordingly, the substance portion can be made to have high image quality, whereas the overlap portion can be made small in data size after compression although the image quality is lower than that of the substance portion.

Specifically, in step S54 of FIG. 23, it is determined whether the MCU is an overlap portion, and the selection signal 2805 is output to the selector 2802 based on the determination. The quantization core unit 2801 divides the frequency converted coefficient value received from the DMAC 2401 by the corresponding quantization table value selected by the selector 2802.

FIG. 25A shows frequency transformed coefficient values. FIG. 25B shows an example of results obtained from quantization using the quantization table 2803 (step S55), and FIG. 25C shows an example of results obtained from quantization using the quantization table 2804 (step S56). Here, the results of division are truncated, but they may be rounded up or down. After step S55 or step S56 has been executed in this manner, the process advances to step S57, where the quantized value is Huffman-encoded.

With the Huffman encoding performed by the encoding unit 2404, the amount of data can be reduced by assigning a short bit-length to a value that is used with high frequency. After quantization, "0" is most frequently used. Accordingly, a short bit-length is assigned to "0". In other words, in JPEG compression, by setting harmonic component coefficient values are set to values as close to "0" as possible, which have less influence on image quality, by adjusting the quantization table values, the amount of data can be reduced while maintaining the image quality as much as possible. Next, the process advances to step S58, where the code data that has undergone Huffman encoding is output and saved in the RAM 106 by a code DMAC 2405, and the image compression process ends.

Next, an image decompression process performed in step S4 of FIG. 5 or in step S24 of FIG. 12 will be described. This image decompression process is performed in an approximately reverse order of the image compression process described above.

Figure 28:
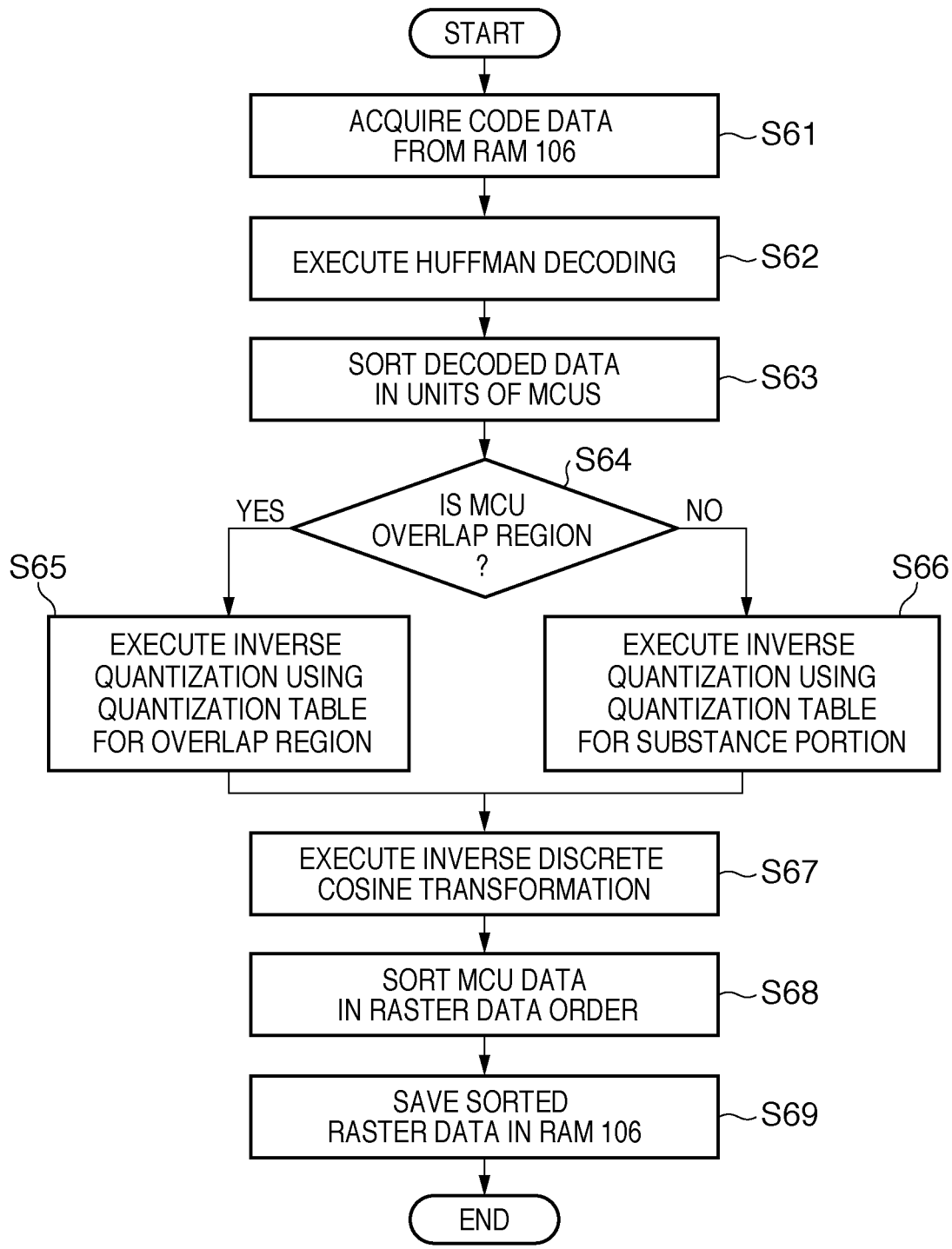
FIG. 28 is a flowchart describing a process performed by the image decompression unit according to the third embodiment.

FIG. 22B is a block diagram showing a configuration of an image decompression unit 121 according to the third embodiment. FIG. 28 is a flowchart describing a process performed by the image decompression unit 121 according to the third embodiment.

Figure 29:
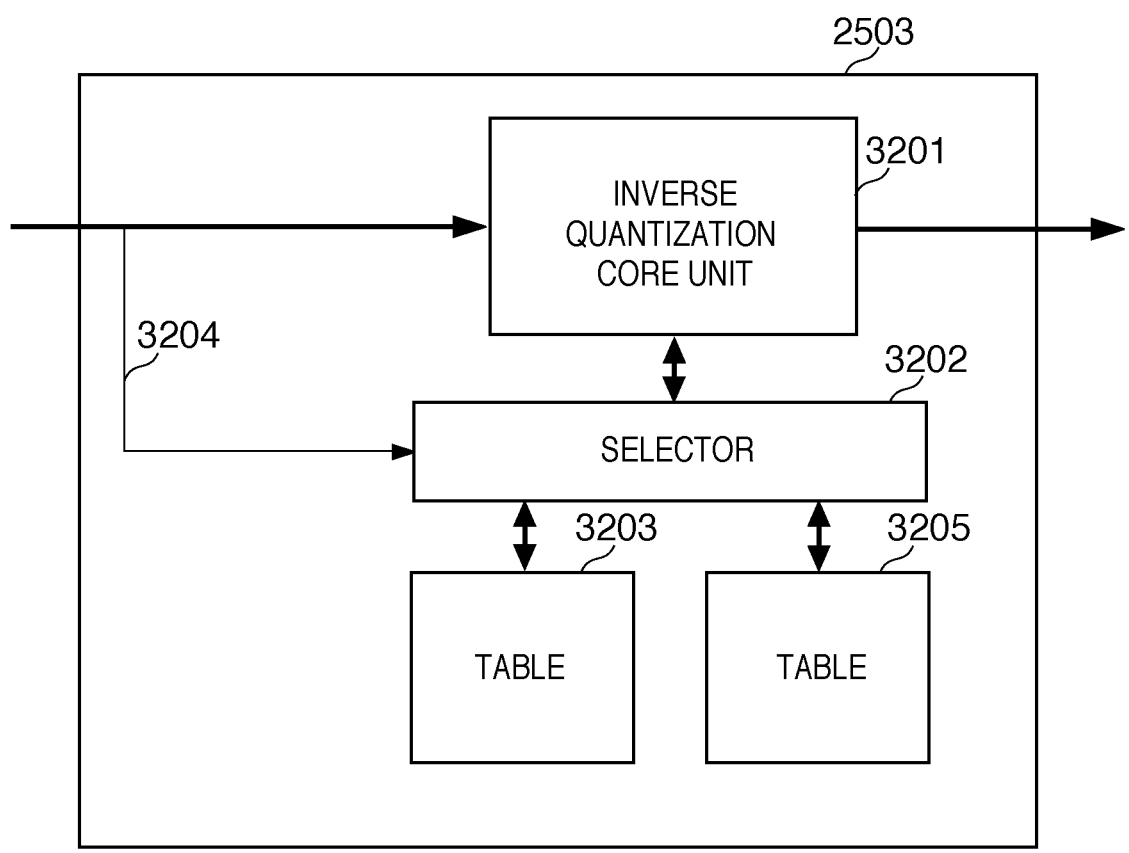
FIG. 29 is a block diagram describing a configuration of an inverse quantization unit of the image decompression unit.

FIG. 29 is a block diagram describing a configuration of an inverse quantization unit 2503 of the image decompression unit 121.

In step S61, a code DMAC 2501 reads the Huffman-encoded code data from the RAM 106. Next, in step S62, a Huffman decoding unit 2502 executes Huffman decoding, and in step S63, the decoded data is sorted in units of MCUs. Then, an inverse quantization unit 2503 performs inverse quantization. In the inverse quantization, the same quantization tables as those used for quantization are used. Specifically, first, in step S64, it is determined whether the MCU is an overlap portion. Then, the obtained result is transmitted to a selector 3202 by using a signal 3204 (FIG. 29). If the signal 3204 is "0", the selector 3202 selects a table 3203 for overlap portion. If the signal 3204 is "1", the selector 3202 selects a table 3205 for substance portion. An inverse quantization core unit 3201 then performs inverse quantization by using the selected table. Specifically, the inverse quantization unit 3201 performs inverse quantization by multiplying the quantization value input from the Huffman decoding unit 2502 by the selected quantization table value (step S65 or step S66).

FIGS. 30A and 30B are diagrams showing an example of inverse quantized values, with FIG. 30A showing an example of results obtained from inverse quantization performed in step S65, and FIG. 30B showing an example of results obtained from inverse quantization performed in step S66.

Next, the process advances to step S67, where the inverse quantized data is inverse discrete cosine transformed by an inverse discrete cosine transformation (inverse DCT) unit 2504. Next, in step S68, the data of the MCU units is converted to bitmap data by a raster DMAC 2505. Then, the process advances to step S69, where the raster data is saved in the RAM 106, and the image decompression process ends.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232862, filed on Oct. 6, 2009, which is hereby incorporated by reference herein in its entirety.

What is claimed is:

1. An image processing apparatus comprising:
an input unit that inputs image data;
a generation unit that generates a plurality of tile images by dividing the image data input by the input unit, each of the tile images including a substance region and an overlap region, the overlap region including a plurality of sub-regions corresponding to a distance from the substance region; and
an image processing unit that executes image processing separately on each of the plurality of tile images generated by the generation unit,
wherein the generation unit, when generating each tile image, converts a resolution of image data in the overlap regions such that a resolution of image data in each sub-region is smaller with increasing distance from the substance region.

2. The image processing apparatus according to claim 1, wherein the generation unit converts the resolution of the image data in the overlap regions to a lower resolution, without converting the resolution of the image data in the substance region.

3. The image processing apparatus according to claim 1, further comprising a setting unit that sets a print mode for when printing is executed based on the image data,
wherein the generation unit converts the resolution of the image data in the overlap regions to a resolution according to the print mode set by the setting unit.

4. The image processing apparatus according to claim 1, wherein the generation unit, when generating each tile image, converts the resolution of the image data in the overlap regions such that the resolution of the image data in each sub-region is smaller than a resolution of image data in the substance region.

5. A method of controlling an image processing apparatus, comprising:
inputting image data;
generating a plurality of tile images by dividing the image data input in the inputting step, each of the tile images including a substance region and an overlap region, the overlap region including a plurality of sub-regions corresponding to a distance from the substance region; and
executing image processing separately on each of the plurality of tile images generated in the generating step,
wherein the generating step, when generating each tile image, comprises converting a resolution of image data in the overlap regions such that a resolution of image data in each sub-region is smaller with increasing distance from the substance region.

6. A non-transitory computer readable storage medium storing a program for causing an image processing apparatus to execute the steps of:
inputting image data;
generating a plurality of tile images by dividing the image data input in the inputting step, each of the tile images including a substance region and an overlap region, the overlap region including a plurality of sub-regions corresponding to a distance from the substance region; and
executing image processing separately on each of the plurality of tile images generated in the generating step, wherein the generating step, when generating each tile image, comprises converting a resolution of image data in the overlap regions such that a resolution of image data in each sub-region is smaller with increasing distance from the substance region.

* * * * *